(12) United States Patent
Ogata et al.

(10) Patent No.: US 6,235,407 B1
(45) Date of Patent: May 22, 2001

(54) STEEL PLATE FOR HIGHLY CORROSION-RESISTANT FUEL TANK

(75) Inventors: Hiroyuki Ogata; Sachiko Suzuki; Kazuo Mochizuki, all of Chiba; Takashi Isogai, Tokyo; Shigeru Usuda, Tokyo; Toru Sano, Tokyo, all of (JP)

(73) Assignees: Kawasaki Steel Corporation, Hyogo; Mitsubishi Motors Corporation, Tokyo, both of (JP)

( * ) Notice: Subject to any disclaimer, the term of this patent is extended or adjusted under 35 U.S.C. 154(b) by 0 days.

(21) Appl. No.: 09/194,130
(22) PCT Filed: Apr. 9, 1998
(86) PCT No.: PCT/JP98/01637
   § 371 Date: Apr. 23, 1998
   § 102(e) Date: Apr. 23, 1998
(87) PCT Pub. No.: WO98/45114
   PCT Pub. Date: Oct. 15, 1998

(30) Foreign Application Priority Data
   Apr. 9, 1997 (JP) .................................................. 9-090623

(51) Int. Cl.⁷ ........................... B32B 15/08; B32B 15/18; B32B 15/16; B65D 6/00
(52) U.S. Cl. .......................... 428/626; 428/457; 428/546; 428/553; 428/560; 428/630; 428/650; 428/653; 428/35.8; 220/4.14
(58) Field of Search ............................... 220/4.41, 4.12, 220/905; 428/546, 553, 560, 615, 639, 626, 630, 632, 650, 651, 652, 653, 658, 659, 681, 680, 35.7, 35.8, 35.9, 328, 331, 457, 458, 460, 461

(56) References Cited

U.S. PATENT DOCUMENTS

| | | | |
|---|---|---|---|
| 4,910,097 | * 3/1990 | Nomura et al. | 428/623 |
| 5,468,461 | * 11/1995 | Hosoda et al. | 523/435 |
| 5,827,618 | * 10/1998 | Oyagi et al. | 428/621 |
| 6,015,628 | * 1/2000 | Urata et al. | 428/623 |

FOREIGN PATENT DOCUMENTS

| | | |
|---|---|---|
| 64-33173 | 2/1989 | (JP) . |
| 2-18981 | 4/1990 | (JP) . |
| 2-18982 | 4/1990 | (JP) . |
| 3-25349 | 4/1991 | (JP) . |
| 7-185453 | 7/1995 | (JP) . |
| 9-173971 | 7/1997 | (JP) . |

* cited by examiner

Primary Examiner—Deborah Jones
Assistant Examiner—Michael LaVilla
(74) Attorney, Agent, or Firm—Young & Thompson

(57) ABSTRACT

A highly corrosion resistant steel sheet for fuel tank comprising a lowermost layer of Zn or Zn-based plating layer deposited on each side of the steel sheet; a chemical conversion film deposited on each of the Zn or Zn-based plating layer; a metal powder-containing organic resin film deposited on one of the chemical conversion film, said metal powder-containing organic resin film containing Al and Ni metal powders and an amine modified epoxy resin; and a silica-containing organic resin film deposited on the other chemical conversion film, said silica-containing organic resin film containing at least one resin having at least one functional group selected from hydroxyl group, isocyanate group, carboxyl group, glycidyl group, and amino group; silica; and a lubricant. The steel sheet of the present invention has excellent corrosion resistance, press workability, resistance weldability and brazing ability, and therefore, the steel sheet of the present invention is particularly useful when it is used in contact with an alcohol or an alcohol-blended gasoline.

16 Claims, 1 Drawing Sheet

Outer side of the fuel tank

Inner side of the fuel tank

STEEL PLATE FOR HIGHLY CORROSION-RESISTANT FUEL TANK

TECHNICAL FIELD

Figure 1:
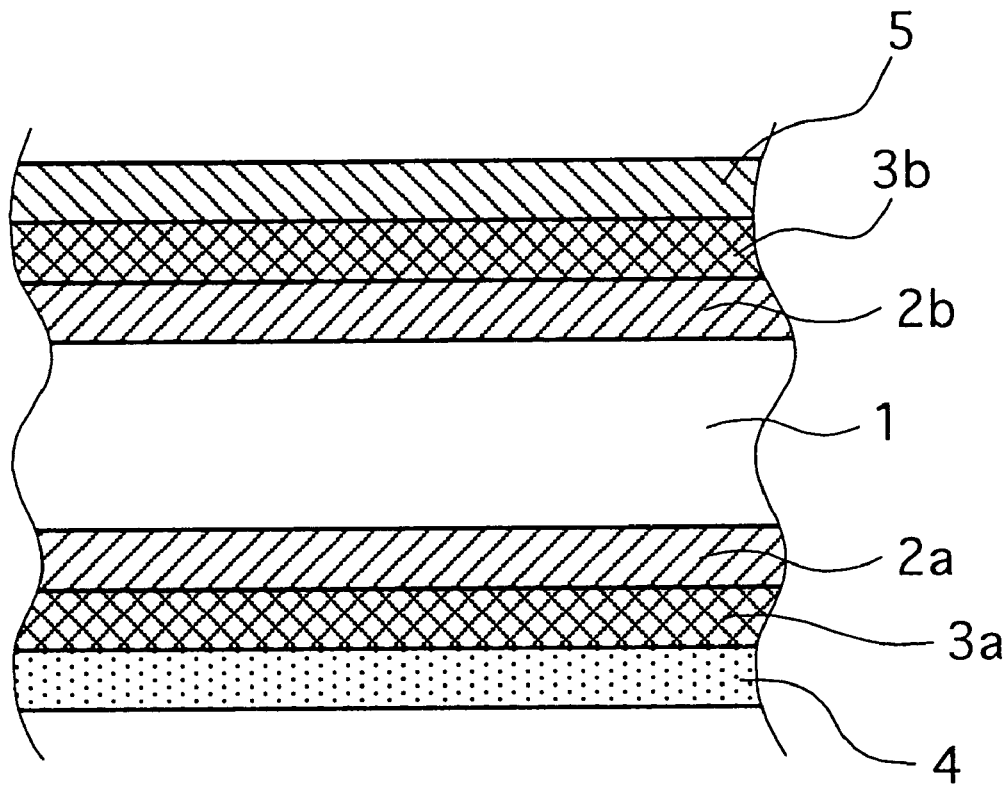

This invention relates to a highly corrosion resistant steel sheet for fuel tank, and more specifically, to a highly corrosion resistant steel sheet for fuel tank with excellent corrosion resistance, press workability and seam weldability which can be used as a tank material resistant to gasoline blended with an alcohol or with an alcohol and formic acid.

BACKGROUND ART

A steel sheet for fuel tank is required to fully meet various requirements such as corrosion resistance to the fuel as well as to the surrounding circumference, weldability, and press workability. Of these requirements, corrosion resistance to the fuel is first explained.

In many countries of North, Central and South Americas, Europe, and the like, departure from petroleum dependency is declared as a national energy policy. In such countries, use as alternative motor vehicle fuels such as an alcohol (methanol, ethanol) or the so called gasohol which is a mixture of gasoline with 5 to 20% alcohol is on the increase through these years.

Such alcoholic fuels have corrosivity markedly higher than ordinary gasoline fuels since they tend to (a) contain water; (b) undergo phase separation when water content increases or temperature decrease; and (c) decompose by oxidation to produce an organic acid (for example, methanol is converted into formic acid, and ethanol is converted into acetic acid), leading to the phase separation and formation of the lower layer mainly comprising alcohol and/or the organic acid and water; and (d) alcohol-gasoline mixtures containing more than 40% of methanol do dissolve the steel sheet plated with term metal (Pb—Sn alloy) which is a major current tank material.

In spite of such situation, motor vehicle fuel tanks are required to have no seam welding defects; to undergo no outer or inner surface corrosion; and to generate no floating corrosion product which may result in the blockage of the filter in the fuel circulation system.

Motor vehicle fuel tank materials currently used are, for example, a hot dip Pb—Sn alloy coated steel sheet as disclosed in JP-B 57-61833 and Zn plated steel sheet with thick chromate layer as disclosed in JP-B 53-19981.

The corrosion resistance of such materials to gasoline, alcohol, or alcohol-blended gasoline (hereinafter referred to as "inner surface corrosion resistance"), however, has been quite insufficient. For example, Pb—Sn alloy had a defect that this alloy is highly soluble in methanol and could not be used with the methanol-blended gasoline in actual use.

On the other hand, a Zn electro-plated steel sheet material with an overlying thick chromate layer has some degree of inner surface corrosion resistance due to sacrificial corrosion protection by the Zn. This material, however, has the defect that zinc dissolves at a high rate in an alcohol and gasoline to generate a large amount of floating white precipitate which causes filter blockage in the fuel circulation system, and after the zinc dissolution, the steel substrate starts to corrode to exhibit red rust. This material is also insufficient as a steel sheet for a fuel tank.

When the Zn electro-plated steel sheet is replaced with a steel sheet plated with a zinc-based alloy such as Zn—Ni alloy plated steel sheet disclosed in JP-A 55-110791; Zn—Co alloy plated steel sheet disclosed in JP-B 57-33347; Zn—Fe alloy plated steel sheet disclosed in JP-B 57-61831; Zn—Al alloy plated steel sheet disclosed in JP-B 54-33222; Zn—Ni—Cr alloy plated steel sheet disclosed in JP-A 57-70288; and Zn—Co—Ni alloy plated steel sheet disclosed in JP-B 57-33347, the zinc dissolution rate from the zinc-based alloy plated layer is considerably suppressed compared to the zinc plated layer, and the corrosion of both the outer and the inner surfaces are thereby reduced. These zinc alloy plated steel sheets, however, still suffer from corrosion of the outer surface of the tank and the generation of the floating white precipitate on the tank inner surface which invites filter blockage and corrosion.

In order to obviate the defects as described above, JP-B 2-18981, JP-B 2-18982, and JP-B 3-25349 disclose highly corrosion resistant steel sheets for fuel tank which have excellent inner surface corrosion resistance to the alcohol alone or the alcohol-blended gasoline, and in particular, to the highly corrosive gasoline containing alcohol and formic acid; whose outer surface has excellent corrosion resistance to the surrounding circumstance (hereinafter referred to as "outer surface corrosion resistance"), and which exhibit satisfactory press workability and resistance weldability on manufacturing fuel tank. For example, JP-B 2-18981 describes a steel sheet which has a metal plated layer comprising a Pb/Sn alloy or metals containing Sn as a main component, and an overlying metal powder-containing organic resin film. JP-B 2-18982 and JP-B 3-25349 disclose steel sheets on which a Zn plated layer or plated layer containing Zn as a main component and an overlying metal powder-containing organic resin film are disposed.

The metal powder-containing organic resin films described in these three patent publications are the films in which phenoxy resin constitute 40 to 90% of the organic resin. Therefore, when a steel sheet having such metal powder-containing organic resin film is used in fabricating a gasoline tank, the metal powder may fall off the organic resin film on the outer surface in the course of press working due to insufficiency in the affinity between the hydroxyl group of the phenoxy resin and the metal powder, and as a consequence, plating layers may become peeled off the steel sheet detracting from press workability.

When a steel sheet having such metal powder-containing organic resin film is used for fabricating a gasoline tank, the inner surface of the tank suffers from insufficient inner surface corrosion resistance in the part wherein the steel sheet has experienced the damage of the metal powder falling off or the plated layer peeling off. The undamaged flat region of the tank also suffers from insufficient inner surface corrosion resistance since the corrosive solution is likely to become settled between the resin and the metal powder in the film. Accordingly, it is still difficult to put these steel sheets into actual use.

In addition, in all of the steel sheets in the abovementioned patent publications, the resin film on the surface corresponding to either the outer surface or the inner surface of the tank contains a curing agent as an essential component. When the degree of curing is too high, the organic layer is not readily heat melted, and in the welding, removal of the film will be difficult in the nugget formation process and seamweldability will be deteriorated. More illustratively, even though current passage points are provided by the metal powder, the film remaining unmelted resists the welding, and as a consequence, the nuggets formed do not sufficiently overlap with each other to result in fuel leakage. In some cases, the insufficient welding strength invites peeling. On the other hand, when the film has cured to an insufficient degree and the curing agent which did not react is present in the film, such part suffers from insufficient aggregation and high hydrophilicity of the unreacted reagent to invite invasion of the corrosive elements (acid, chlorine ion etc.) into the film to thereby adversely affect the outer/inner surface corrosion resistance of the tank.

JP-A 64-33173 describes a weldable corrosion resistant epoxy-based coating composition which contains a metal powder mixture of aluminum, stainless steel, and alloys thereof, and a powder consisting essentially of nickel. When this composition is used to coat the steel sheet used for a gasoline tank, affinity between the epoxy resin or the phenoxy resin and the metal powder is insufficient as in the above-described case, and the metal powder is likely to fall off the film during the press working. Therefore, when a tank is coated on both sides with this coating composition, both surfaces of the tank will suffer from the film damage and the associated plating layer damage, and the corrosion resistance is far from being sufficient. The non-damaged flat region on both sides of the tank also suffer from insufficient corrosion resistance since invasion of corrosive ions occurs at the resin/metal powder boundary due to insufficient affinity between the resin and the metal powder.

As described above, the steel sheet materials for fuel tank which have so far been proposed suffer from various insufficiencies in their properties, and the state of the art is that none is in actual use.

DISCLOSURE OF INVENTION

In view of such situation, an object of the present invention is to obviate the drawbacks of the currently available tank materials and provide a highly corrosion resistant steel sheets adapted for use in a fuel tank which has excellent inner surface corrosion resistance to the alcohol-blended gasoline, and in particular, to a gasoline containing methanol or formic acid formed by oxidation of the methanol; which exhibits excellent press workability and seam weldability during the tank production; and which has excellent outer surface corrosion resistance on the outer surface of the fuel tank after the press working.

The inventors of the present invention have made an intensive study on various platings, surface treatments, resin films, and additives to such resin films. As a consequence of such investigation, the inventors found that the problems as described above can be obviated at once by depositing a Zn plated or plated layer containing Zn as a main component (hereinafter referred to as "Zn-based plating layer") as the lowermost layer; a chemical conversion film on the lowermost layer; and a metal powder-containing organic resin film on one of the chemical conversion film on the side of the steel sheet which will be the inner surface of the tank when a fuel tank is fabricated from the steel sheet (surface of this side is hereinafter referred to as "inner surface"); and a silica-containing organic resin film containing a lubricant and silica deposited on the other chemical conversion film on the side of the steel sheet which will be the outer surface of the tank when a fuel tank is fabricated from the steel sheet (surface of this side is hereinafter referred to as "outer surface"). The present invention has been completed on the bases of such an entirely new finding.

According to the present invention, there is provided a highly corrosion resistant steel sheet for fuel tank comprising a lowermost layer of Zn or Zn-based plating layer deposited on each side of the steel sheet; a chemical conversion film deposited on each of the Zn or Zn-based plating layer; a metal powder-containing organic resin film deposited on one of the chemical conversion film, said metal powder-containing organic resin film containing Al and Ni metal powders and an amine modified epoxy resin; and a silica-containing organic resin film deposited on the other chemical conversion film, said silica-containing organic resin film containing at least one resin having at least one functional group selected from hydroxyl group, isocyanate group, carboxyl group, glycidyl group, and amino group; silica; and a lubricant.

The metal powder-containing organic resin film may preferably contain 30 to 110 parts by weight of the metal powder per 100 parts by weight of the organic resin, and the metal powder has a composition of Ni/Al of 80/20 to 30/70 (weight ratio).

The metal powder-containing organic resin film may preferably have a thickness in the range of from 2 to 10 $\mu$m.

The silica-containing organic resin film may preferably comprise 100 parts by weight of at least one resin containing at least one functional group selected from hydroxyl group, isocyanate group, carboxyl group, glycidyl group and amino group; 5 to 80 parts by weight of silica; and 1 to 40 parts by weight of a lubricant.

The silica-containing organic resin film may preferably have a thickness in the range of from 0.5 to 1.5 $\mu$m.

Preferably, the Zn-based plating layer has been deposited to a coating weight of from 10 to 200 g/m$^2$.

BEST MODE FOR CARRYING OUT THE INVENTION

Next, the present invention is described in further detail.

The highly corrosion resistant steel sheets for fuel tank of the present invention has a lowermost layer of Zn or Zn-based plating layer deposited on the steel sheet. The Zn-containing plating layer has an electric potential less than the steel substrate. Therefore, red rust generation is prevented by the Zn through sacrificial corrosion protection in the press worked area wherein the plating layer has been damaged, and the outer surface corrosion resistance of the fuel tank is thereby improved. On the other hand, impregnation of aqueous formic acid into the inner surface is prevented by the barrier action of the organic film, and dissolution of the Zn which is not resistant to the acid and the resulting formation of floating white precipitate are thereby prevented.

The sacrificial corrosion protection as described above functions when the plating layer is a Zn layer. However, when the plating layer comprises a Zn-based plating layer, the dissolution rate of the plating layer during the sacrificial corrosion protection is retarded, and elongation in life of the tank before pinhole formation will be realized at a lower coating weight of the plating layer compared to the case of the plating layer comprising the zinc alone. The corrosion resistance after depositing the overlying chemical conversion film and the metal powder-containing organic resin film is also higher when the plating layer is a Zn-based plating layer. Such Zn-based plating layers may preferably be at least one member selected from a Zn—Ni alloy plating layer, a Zn—Co alloy plating layer, a Zn—Fe alloy plating layer, a Zn—Al alloy plating layer, a Zn—Ni—Cr alloy plating layer, and a Zn—Ni—Co alloy plating layer. The Zn-based plating layers may comprise two or more such layers.

The Zn or the Zn-based plating layers may be deposited to a coating weight of from 10 to 200 g/m$^2$, and more preferably, to a coating weight of from 20 to 100 g/m$^2$. When the coating weight is less than 10 g/m$^2$, the effect of masking the steel sheet surface is insufficient, and the corrosion resistance required for the lowermost layer is not fulfilled. A coating weight in excess of 200 g/m$^2$ is uneconomical since the corrosion resistance required for the lowermost layer is satisfied and no further improvement is attained.

The Zn-based or the Zn-based plating layer as described above may be formed by electroplating method or hot dip method which are known in the art. For example, a Zn electroplated layer may be formed by using a mixed solution of 410 g/l of $ZnSO_4.7H_2O$, 20 g/l of $AlCl_3$, and 75 g/l of $Na_2SO_4$, and electroplating at a pH of 3 to 5, a temperature of 20 to 30° C., and a current density of 1 to 10 A/dm$^2$.

The Zn-based electroplated layer may be formed by using a mixed solution of 300 g/l of $ZnSO_4.7H_2O$ and 200 g/l of $NiSO_4.6H_2O$ in the case of Zn—Ni alloy plating; a mixed solution of 200 g/l of $ZnSO_4.7H_2O$, 200 g/l of $CoSO_4.7H_2O$ and 45 g/l of $Na_2SO_4$ in the case of Zn—Co alloy plating; a mixed solution of 110 g/l of $ZnSO_4.7H_2O$, 100 g/l of $FeSO_4.7H_2O$, 20 g/l of $(NH_4)_2SO_4$, 20 g/l of KCl, and 60 g/l of antimony citrate in the case of Zn—Fe alloy plating; a mixed solution of 160 g/l of $ZnSO_4.7H_2O$, 240 g/l of $NiSO_4.6H_2O$, and 2 g/l of $CrO_3$ in the case of Zn—Ni—Cr alloy plating; and a mixed solution of 100 g/l of $ZnSO_4.7H_2O$, 60 g/l of $NiSO_4.6H_2O$, 60 g/l of $CoSO_4.7H_2O$, 5 g/l of $(NH_4)_2SO_4$, and 10 g/l of $H_2SO_4$ in the case of Zn—Ni—Co alloy plating. The Zn-based electroplated layer may be formed by conducting the electroplating at a pH of 2.0 to 4.5, a current density of 5 to 50 A/dm$^2$, and a temperature of room temperature to 60° C. In the case of Zn—Al alloy, the plating layer may be formed by using a hot plating bath comprising 4 to 5% of Al and 95 to 96% of Zn, or 50 to 60% of Al and 50 to 40% of Zn.

In the present invention, a chemical conversion film is subsequently deposited on each of the plating layer on both sides of the steel substrate. Preferable chemical conversion films include chromate film, zinc phosphate film, and iron phosphate film. In the case of the chromate film, the film may be deposited to a chromium coating weight of 5 to 200 mg/m$^2$, and preferably to a coating weight of 10 to 100 mg/m$^2$ per single surface when calculated in terms of metallic chromium. When the chromium coating weight is less than 5 mg/m$^2$, adhesion with the overlying organic film will be insufficient, and the film of the part in sliding contact with the press-working member will become peeled, and in a severe case, peeling of the plating layer may occur. An insufficient chromium coating weight may also invite shortage of the hexavalent chromium which should be used for autoremedy of the film, and such shortage results in the insufficient corrosion resistance of the press worked region on both outer and inner surfaces of the steel sheet in synergy with the above-described peeling of the plating layer. When the chromium coating weight is in excess of 200 mg/m$^2$, the chromate film will be extremely brittle and peeling of the chromate film will occur in the part in sliding contact with the press-working member simultaneously with the peeling of the overlying organic resin film. The corrosion resistance will be insufficient on both the outer and the inner surfaces.

In the case of the zinc phosphate film or the iron phosphate film, the film may be deposited to a coating weight of 1 to 5 g/m,$^2$, and preferably to a coating weight of 2 to 4 g/m$^2$ per single surface. The coating weight of less than 1 g/m$^2$ will result in reduced corrosion resistance. When the coating weight is in excess of 5 g/m$^2$ the zinc phosphate or the iron phosphate film will be brittle and the film may experience powdering, and simultaneously, the film will exhibit increased welding resistance and hence, reduced weldability.

In the present invention, the formation of such film may be accomplished by any of the conventional processes. For example, the chromate film maybe formed by dip chromate treatment or electrolytic chromate treatment in an aqueous solution containing anhydrous chromic acid, chromate, or bichromic acid as the main reagent. Alternatively, the chromate film may be formed by coating a chromate treating solution comprising a mixture of the above-described aqueous solution with colloidal silica on the plated steel sheet to form a film mainly comprising hydrated chromium. It should benoted that the plated steel sheet treated with the chromate treating solution may be subjected to a step of squeezing with a flat rubber roller or a step of drying such as hot air drying to thereby complete the chromate film formation.

In the case of the zinc phosphate film or the iron phosphate film, the film formed is a crystalline film formed by the reaction between the zinc in the underlying layer and the zinc phosphate treating solution, and therefore, the film formed is quite dense. The treatment solution may have added thereto an oxidizing agent such as nitric acid, nitrous acid, or chloric acid or a heavy metal such as Ni ion for the purpose of promoting the reaction with the zinc plating layer. The oxidizing agent promotes dissolution of the zinc in the underlying layer and suppresses the hydrogen generation to thereby promote formation of a dense film. The situation is similar in the case of the iron phosphate film. The plated steel sheet is dipped in the solution of the reagent or sprayed with the solution to form the zinc phosphate film or the iron phosphate film on the steel substrate.

The steel sheet for fuel tank of the present invention has an outermost layer on each of the chemical conversion film. On the inner side, a metal powder-containing organic resin film containing a metal powder and an amine modified epoxy resin is deposited on the chemical conversion film, and on the outer side, a silica-containing organic resin film containing an organic resin, silica, and a lubricant is deposited on the chemical conversion film. The inner side of the steel sheet for fuel tank of the present invention has excellent weldability and gasoline resistance, and therefore, the steel sheet is used such that this side will be on the inner side (the side in contact with gasoline or the like) of the fuel tank such as a gasoline tank. The outer side has excellent corrosion resistance and lubricity, and it is preferable that this side will constitute the outer surface of the fuel tank such as a gasoline tank.

The metal powder-containing organic resin film formed as the outermost layer on the inner side of the steel sheet for fuel tank of the present invention contains a metal powder which has excellent corrosion resistance and durability against alcohol-blended gasoline, and in particular, gasoline containing methanol itself and formic acid formed by oxidation of the methanol and a resin component, and this layer plays the role of a barrier layer which prevents the lowermost plating layer and the chemical convention layer from directly contacting with the alcohol-based fuel.

In the steel sheet for fuel tank of the present invention, the metal powder is added to the metal powder-containing organic resin film in order to provide resistance weldability to the steel sheet. An organic resin film usually has a high electric insulation, and exposure of the steel sheet substrate is not at all expectable when the resin film has a thickness of more than 2 µm and the resistance welding is difficult. Therefore, increase in electric conductivity of the organic resin film is required in the present invention, and the metal powder of necessary amount is therefore dispersed in the organic resin film on the inner side of the gasoline tank.

The metal powder used may be the effective one having a high intrinsic resistance in view of the higher calorific value, and exemplary metals are Ni, Al, Fe and Cu. Of these metals, use of Ni is most effective since Ni has a high corrosion resistance to methanol as well as a high intrinsic resistance. Though Al is not preferable to weld for the lower intrinsic resistance and the lower melting point compared to Ni, use of Al is also effective in view of its flaky configuration which suppresses permeation through the organic film of the corrosive ions such as those in the aqueous formic acid as described below. In view of such situation, Al powder and Ni powder are combined in the present invention at an appropriate ratio and added to the organic resin film. The objects of increasing the electric conductivity of the film and suppressing the permeation of the corrosive ions and improving the corrosion resistance and durability are thereby attained. The organic resin film may also contain Fe, Cu and the like.

The metal powder used may be of any configuration including particular and flake forms. The inner surface corrosion resistance and the resistance weldability, however, vary to certain extent by the configuration of the metal powder as described above.

The Ni powder used in the present invention may preferably be of particulate form with an average particle diameter of 1 to 9 $\mu$m, and more preferably, 2 to 7 $\mu$m. When the average particle diameter is less than 1 $\mu$m, the metal powder can only provide insufficient current passage points. When the average particle diameter is in excess of 9 $\mu$m, the film will have abundant current passage points to improve the resistance weldability only with a little adding while the film formed will be porous. Such porous film results in a reduced inner surface corrosion resistance as well as film powdering during the press working.

The Al powder used in the present invention may preferably be of flake form with an average major diameter of 8 to 18 $\mu$m, an average minor diameter of 1 to 10 $\mu$m, and a thickness of 1 to 5 $\mu$m. More preferably, the Al powder may have an average major diameter of 10 to 15 $\mu$m, an average minor diameter of 5 to 8 $\mu$m, and an average thickness of 2 to 4 $\mu$m. When the average major diameter and the average minor diameter are less than 8 $\mu$m and 1 $\mu$m, respectively, the area of the flake will be insufficient and the flake will only have reduced ability of suppressing the permeation of the corrosive ions such as formic acid, and result in a reduced inner surface corrosion resistance. Similar phenomena may occur when either one of the average major diameter and the average minor diameter is excessively short. On the other hand, when the average major diameter and the average minor diameter are in excess of 18 $\mu$m and 10 $\mu$m, respectively, the film will be excessively porous and the film will suffer from insufficient strength and brittleness, inviting powdering and reduced inner surface corrosion resistance in the press worked region. When the average thickness is less than 1 $\mu$m, the inner surface corrosion resistance will last for a shorter period. When the average thickness is in excess of 5 $\mu$m, a larger percentage of Al powder will be exposed to the surface of the coating film, adversely affecting the resistance weldability.

The metal powder-containing organic resin film may have a total content of the Ni metal powder and the Al metal powder in the range of from 30 to 110 parts by weight, and preferably from 45 to 100 parts by weight per 100 parts by weight of the organic resin. When the total content is less than 30 parts by weight, the film is likely to suffer from insufficient current passage points, and the insufficient electric conductivity may result in poor resistance weldability. When the total content is in excess of 110 parts by weight, the organic film will be brittle and powdering resistance during the press working will be reduced, and the resulting steel sheet is likely to suffer from poor inner surface corrosion resistance.

In the present invention, the resistance weldability and the inner surface corrosion resistance may be improved by adjusting the Ni/Al ratio (weight ratio) to the range of from 80/20 to 30/70 provided that the metal powder content is within the above-specified range. When the Ni/Al ratio is less than 30/70, amount of the Ni which has the high intrinsic resistance will be reduced and the resistance weldability is likely to be insufficient. When the Ni/Al ratio is in excess of 80/20, amount of the Al which suppresses the fuel impregnation will be reduced and the inner surface corrosion resistance is likely to be insufficient. The Ni/Al ratio is preferably in the range of from 70/30 to 40/60.

In the present invention, the metal powder-containing organic resin film deposited on the inner side should contain a resin component which has high corrosion resistance and durability against gasoline, alcohol and formic acid-containing fuel, and which provides sufficient coating adhesion to the matrix (the steel sheet+the plating layer+the chemical conversion film), and excellent workability during the press working. In view of such situation, the metal powder-containing organic resin film should contain an amine modified epoxy resin. A high press workability, an excellent corrosion resistance to the alcohol-blended fuel, as well as sufficient coating adhesion to the matrix are thereby provided. An amine modified epoxy resin is an epoxy resin wherein the oxyrane ring of the epoxy resin constituting the main skeleton has been opened by an amine. The epoxy resin constituting the main skeleton of the amine modified epoxy resin is preferably an epoxy resin having a weight average molecular weight in the range of from 5,000 to 50,000, and preferably from 10,000 to 40,000 to realize a high press workability.

The epoxy resin constituting the main skeleton of the amine modified epoxy resin may be, for example, a bisphenol A epoxy resin, a bisphenol F epoxy resin, a cycloaliphatic epoxy resin, a hydantoin epoxy resin, a novolak epoxy resin, or a glycidyl ester epoxy resin. Of these epoxy resins, use of a bisphenol A epoxy resin or a bisphenol F epoxy resin is preferred in view of the high stability of the coating composition during the formation of the metal powder-containing organic resin film and the nonstringent conditions required for forming a film of excellent press workability and high inner surface corrosion resistance.

Exemplary such epoxy resins are Epicoat 1010, 1009, 1007, 1004 and 1001 (products of Yuka Shell Epoxy K.K.), and phenoxy resins (manufactured by UCC) which are highly polymerized such epoxy resins. Such epoxy resins may be used alone or in the form of epoxy ester resins by reacting the epoxy resin with a dicarboxylic acid such as adipic acid, azelaic acid, sebasic acid, phthalic acid, or dimer acid. The epoxy resin may be used together with a polyalkyleneglycol diglycidylether.

The amines which may be added to the oxyrane ring of the epoxy resin in the amine modified epoxy resin include primary and secondary amines, for example, monoalkanolamines such as ethylethanolamine and ethanolamine; and dialkonolamines such as diethanolamine, dipropanolamine and dibutanolamine. Of these amines, the preferred is diethanolamine in view of the stable addition conditions and good adhesion with the chemical conversion film and the metal powder.

In the amine modified epoxy resin, the alkanolamine is added to the main skeleton of the epoxy resin, namely to the oxyrane ring of the epoxy resin preferably in a molar amount of 0.2 to 1.0 mole per 1 equivalent of the oxyrane ring. When the epoxy equivalent is 500 to 1000, the preferred molar amount of the alkanolamine is 0.2 to 0.6 mole, and when the epoxy equivalent is 1000 to 5000, the preferred molar amount of the alkanolamine is 0.6 to 1.0 mole. When the amount of the alkanolamine is less than 0.2 mole, the degree of modification by the amine will be insufficient, and the affinity between the metal powder and the amine modified epoxy resin will be reduced to result in the falling off of the metal powder from the film during the press working, and in severe cases, the plating layer is peeled off to adversely affect the press workability. Such situation also invites stagnation of the corrosive ions in between the resin and the metal powder in the film and the film will exhibit insufficient hydrophobicity. Consequently, the film will exhibit poor inner surface corrosion resistance to the highly corrosive methanol-blended fuels since corrosive ions such as formate ion are likely to impregnate into the film. When the amount of the alkanolamine added is in excess of 1.0 mole, the portion of the amine exceeding 1.0 mole will not be added to the oxyrane ring detracting from cost performance, and the excessive amine will increase moisture absorption of the film to adversely affect the inner surface corrosion resistance.

As described above, the amine modified epoxy resin plays the role of reinforcing the boundary between the metal powder and the main skeleton epoxy resin in the metal powder-containing organic resin film. Another characteristic feature associated with the use of the amine modified epoxy resin is action of increasing the adhesion between the metal powder-containing organic resin film and the chemical conversion film.

Such boundary reinforcing action contributes to improvement of the corrosion resistance of the flat region, suppression of the films from being peeled off during the press working, as well as improvement of the inner surface corrosion resistance in the press worked region.

In the present invention, the amine modified epoxy resin may preferably have a weight average molecular weight in the range of from 5,000 to 50,000. When the weight average molecular weight is less than 5,000, inter molecular force will be insufficient because the molecular weight of the main skeleton epoxy resin is too low and the insufficient inter molecular force will result in the poor film toughness. As a consequence, the film will be damaged during the press working, and the film may not satisfy the required press workability. When the weight average molecular weight is in excess of 50,000, amount of the alkanolamine added to the oxyrane ring at the end of the molecule will be reduced, and the affinity between the resin and the metal powder will be insufficient. Such insufficient affinity is likely to result in falling of the metal powder off the film during the press working and the inner surface corrosion resistance not meeting the required level. When the metal powder-containing organic resin film contains a resin other than the amine modified epoxy resin, the metal powder may be blended in the metal powder-containing organic resin at a blend ratio of 30 to 110 parts by weight, and more preferably at 45 to 100 parts by weight of the metal powder per 100 parts by weight of the total organic resin.

The metal powder-containing organic resin film may contain one or more resins other than the amine modified epoxy resin such as urethane modified epoxy resin, urethane resin, epoxy resin, acrylic resin, and olefin resin.

In the steel sheet for fuel tank of the present invention, the metal powder-containing organic resin film is preferably deposited to a thickness of 2 to 10 $\mu$m. When the thickness is less than 2 $\mu$m, the film will exhibit an inner surface corrosion resistance lower than the level required for an inner surface layer. When the thickness is in excess of 10 $\mu$m, the inner surface corrosion resistance and the press workability will be saturated, and seam weldability will be reduced.

In the steel sheet for fuel tank of the present invention, the metal powder-containing organic resin film on the inner surface may optionally contain additives such as a lubricant, a coupling agent, a pigment, a thixotropic agent, a dispersant, or the like.

In the present invention, the metal powder-containing organic resin film may be provided by preparing a coating composition containing the above-described amine modified epoxy resin, the metal powders of Al and Ni, and the optionally added various additives, and applying the thus prepared coating composition on the chemical conversion film on the inner side.

The coating composition used in forming the metal powder-containing organic resin film on the inner surface may be prepared by adding the alkanolamine to the epoxy resin having an epoxy equivalent of 500 to 5000 and promoting the reaction at normal temperature to 100° C. for 4 to 5 hours to obtain the amine modified epoxy resin, and blending the thus obtained amine modified epoxy resin with the metal powders and the various optional additives at an appropriate blend ratio by means of a sand mill or an attriter.

In the steel sheet for fuel tank of the present invention, the silica-containing organic resin film provided on the chemical conversion film on the outside comprises a resin, silica and a lubricant.

The silica-containing organic resin film deposited on the outer side is a film of lubricated resin which has formed a composite with silica. The base resin used as the resin component is at least one resin having at least one functional group selected from hydroxyl group, isocyanate group, carboxyl group, glycidyl group, and amino group. Exemplary such resins are epoxy resin, alkyd resin, acrylic resin, urethane resin, polyvinyl butyral resin, phenol resin, melamine resin, and the like.

In the silica-containing organic resin film of the steel sheet for fuel tank of the present invention, such resin component reacts with hydroxyl group on the silica to form an inorganic-organic composite film. The outer surface corrosion resistance of the exterior surface of the tank is thereby improved.

In the silica-containing organic resin film, silica is blended into the film for the purpose of providing corrosion resistance with the organic resin film on the outer surface. Examples of such silica are colloidal silica (for example, Snowtex-O and Snowtex-N manufactured by Nissan Chemical K.K.), organosilica sol (for example, ethyl cellosolve silica sol manufactured by Nissan Chemical K.K.), silica-powder (for example, gas phase silica powder manufactured by Aerosil K.K.), organic silicate which is converted into silica through condensation (for example, use of ethyl silicate with an acid catalyst), and the like. The silica used in the present invention may preferably have a particle size of 5 to 70 nm for uniform dispersion.

In the present invention, a silane coupling agent may be used for a reaction promoting agent between the base resin and the silica. Exemplary silane coupling agents used include γ-(2-aminoethyl)aminopropyltrimethoxysilane and γ-glycidoxy-propyltrimethoxysilane.

Various additives commonly used in the art such as a reaction promoter, a stabilizer, a dispersant, and the like may be added to the base resin in an amount which does not adversely affect the merits of the present invention, and addition of such additives is recommended.

Next, the lubricant blended in the silica-containing organic resin film of the steel sheet for fuel tank of the present invention is explained. Dry lubricants are generally used for Spa lubricating bearings, and exemplary such dry lubricants include organic lubricants such as polyolefin waxes, fluorine waxes and inorganic lubricants such as molybdenum disulfide, organic molybdenum, graphite, carbon fluoride, metal soap, and boron nitride. These lubricants are added to plastics, oils, greases, and the like in order to improve lubricity. In the present invention, these lubricants were used for investigating the lubricity. In order to produce a steel sheet coated with a highly lubricated resin film which can endure continuous press working with no film peeling even when subjected to a high speed press working under severe press working conditions as carried out in the present invention associated with heat generation in the region in sliding contact with the press working members, a film design as described below is important:

(1) The film should have a high hardness so that the contact area between the mold and the worked material may be minimized as much as possible. Use of a base resin with a high glass transition temperature (Tg) is effective. (2) A lubricant which protrudes beyond the film surface should be employed in order to improve the lubricity between the mold and the film surface.

With regard to (1), use of a silica-containing organic resin film having a Tg of 0 to 90° C. is preferred. When the Tg is lower than 0° C., the hardness of the film is too low and the film is too soft at the mold temperature or the steel sheet surface temperature during the press working, and the contact area of the mold and the worked material will be too much to detract from the workability. When the Tg is higher than 90° C., the film will be too brittle and the workability will be poor. Tg is preferably in the range of from 60 to 80° C.

With regard to (2), it has been found that use of a lubricant having an average particle size of 1 to 7 $\mu$m is preferable. When the average particle size is less than 1 $\mu$m, the amount of the lubricant which protrudes over and beyond the organic film will be insufficient to detract from the press workability. When the average particle size is in excess of 7 $\mu$m, the organic film will be too brittle to result in an insufficient powdering resistance of the film and poor press workability.

The lubricant is preferably a polyolefin wax, and use of a wax comprising the polymer of an olefinic hydrocarbon such as polyethylene, polypropylene, polybutene or a combination thereof is preferred. Use of a lubricant containing fluorine is also preferable.

In the press working, the lubricant in the silica-containing organic resin film forms a lubricating layer between the film layer and the mold, and this lubricating layer realizes good press workability.

Lubricants of various melting points are known for the type of the lubricant as described above, and any lubricant may be used as long as the melting point is in the range of from 70 to 150° C. A lubricant of low melting temperature may be combined with a lubricant of higher melting temperature, and the press workability is even more improved by such combination. When the melting point is lower than 70° C., modulus of the lubricating layer will be significantly reduced under the severe press working conditions associated with heat generation, and the lubricity will be reduced to detract from the press workability. When the melting point is higher than 150° C., the lubricant will not be sufficiently softened and the lubricating layer will be too tough. Therefore, the lubricity will be insufficient to detract from the press workability.

Preferably, the silica and the lubricant are blended in the silica-containing organic resin film at a content as described below. The silica incorporated for improving the corrosion resistance is preferably added in an amount of 5 to as described above to facilitate mixing of such components with the base resin and other critical components as well as other optional additives.

The silica-containing organic resin film may preferably have a glass transition temperature (Tg) in the range of from 0 to 90° C. When the Tg is outside this range, the resulting product will suffer from poor press workability, and the press worked region will exhibit poor corrosion resistance.

In the present invention, the silica-containing organic resin film is preferably deposited to a dry thickness of 0.5 $\mu$m to 1.5 $\mu$m per one surface. When the film thickness is less than 0.5 $\mu$m, the surface profile of the steel sheet substrate is not sufficiently covered and the corrosion resistance will be insufficient. When the film thickness is in excess of 1.5 $\mu$m, the resulting product will suffer from poor resistance weldability although the corrosion resistance is improved. Wettability by the brazing filler metal will also be significantly reduced to result in a greatly reduced brazing ability.

The steel sheet for fuel tank of the present invention of the present invention has the constitution as described above. In press forming the steel sheet, the steel sheet may be applied with a lubricating oil depending on the difficulty or ease of the press working, and such application of the lubricating oil is rather advantageous in view of preventing the damage of the 80 parts by weight per 100 parts by weight of the at least one resin containing at least one functional group selected from hydroxyl group, isocyanate group, carboxyl group, glycidyl group and amino group. When the silica is blended at an amount of less than 5 parts by weight, corrosion resistance will be reduced. When the silica is blended at an amount in excess of 80 parts by weight, the film will be brittle and die galling will occur during the press working to detract from the press workability. Such high content of the silica will also adversely affect the resistance weldability since silica is not readily pyrolyzed. The more preferable amount of the silica blended is in the range of from 20 to 60 parts by weight.

The lubricant is preferably added in an amount of 1 to 40 parts by weight per 100 parts by weight of the at least one resin containing at least one functional group selected from hydroxyl group, isocyanate group, carboxyl group, glycidyl group and amino group. When the amount of the lubricant blended is in excess of 40 parts by weight, the silica-containing organic resin film formed will have an insufficient strength and the lubricity will be reduced. When the amount of the lubricant blended is less than 1 part by weight, the lubricity will be insufficient. The more preferable amount of the lubricant blended is in the range of from 5 to 30 parts by weight.

In the silica-containing organic resin film, the components as described above is preferably added in the amount coating.

Next, the deposition of the film layers as describe above is explained in detail.

In forming the metal powder-containing organic resin film on the inner side, a coating composition containing the above-described amine modified epoxy resin as its main ingredient with an appropriate amount of the organic solvent or the curing agent, the metal powders, and other additives commonly used in the art is first prepared, and this coating composition is applied on the chemical conversion film and dried.

An embodiment of forming the metal powder-containing organic resin film on the inner surface is described below.

A reactor equipped with a reflux condenser, a stirrer, a thermometer, and a nitrogen gas bubbler was charged with 2000 g (1 equivalent of oxyrane ring) of Epicoat 1007 (manufactured by Yuka Shell Epoxy K.K., epoxy resin having an epoxy equivalent of 2000) and 1000 g of toluene. After purging the atmosphere with nitrogen, temperature was elevated to 80° C. to form a uniform solution. 52.5 g of diethanol amine was then added dropwise for 30 minutes, and the reaction was allowed to take place for 1 hour.

To the thus obtained composite were added the metal powder, the organic solvent and other additives, and the mixture was kneaded to prepare a suspension. The amount of the organic solvent is preferably 60 to 85 parts by weight per total suspension. Next, the suspension was coated to the required thickness with a roll coater, and the coating was dried and baked at the sheet temperature in the range of 150 to 300° C.

An embodiment of forming the silica-containing organic resin film on the outer surface is described below.

A reactor equipped with a reflux condenser, a stirrer, a thermometer, and a nitrogen gas bubbler was charged with 200 g of the solution of Denka butyral #2000-L (manufactured by Denki Kagaku Kogyo K.K., polyvinyl butyral resin: average degree of polymerization=300) in cellosolve at a solid content of 30%. After purging the atmosphere with nitrogen, 100 g of ethyl polysilicate (ethyl silicate 40, manufactured by Nippon Corcoat Kagaku K.K., Z:degree of polymerization=4 to 6, $SiO_2$ content 40%) was added from a dropping funnel with sufficient stirring. Next, 30 g of aqueous solution of orthophosphoric acid was slowly added as a catalyst for both the reaction between the polyvinyl butyral resin and the ethyl polysilicate and the reaction within the ethyl polysilicate itself, and the mixture was heated to 90° C. and allowed to react under reflux for 4 hours. Next, apolyolefin wax was added as a lubricant to obtain a colorless resin mixture or resin composite. This resin mixture or resin composite was applied to a predetermined thickness by a known method such as roll coating, spray coating, dipping or the like, and the coating was dried usually at a temperature of 50 to 180° C. for 3 to 90 seconds.

An embodiment of the thus obtained steel sheet for fuel tank of the present invention is shown in FIG. 1. As shown in FIG. 1, the steel sheet for fuel tank of the present invention comprises lowermost layers of Zn or Zn-based plating layers 2a and 2b respectively deposited on both side of the steel sheet 1; chemical conversion films 3a and 3b deposited on the Zn or Zn-based plating layers 2a and 2b; a metal powder-containing organic resin film deposited 4 on one of the chemical conversion film 3a; and a silica-containing organic resin film 4 deposited on the other chemical conversion film 3b.

EXAMPLES

Next, the present invention is described by referring to the Examples which by no mean limit the scope of the present invention.

Examples

The highly corrosion resistant steel sheets for fuel tank of the present invention and steel sheets for comparative purpose were prepared by using a cold rolled steel sheet (SPCC) of 0.8 mm thick. In the production, the steel sheet was subjected to pretreatment (electorolytic degreasing, electrolytic pickling) before depositing the lowermost layer comprising zinc or a zinc alloy of several types. The abbreviations of the plated steel sheets used are as listed below.

GA: hot dip zinc alloy-coated steel sheet (Fe content in the plating: 10% by weight)

ZnNi: steel sheet electroplated with a Zn—Ni alloy (nickel content, 12% by weight)

GI: hot dip zinc-coated steel sheet

GF: steel sheet plated with an alloy containing 5% aluminum and 95% zinc

GL: steel sheet plated with an alloy containing 55% aluminum and 45% zinc

EG: Zinc electroplated steel sheet

Zn—Co: steel sheet plated with a Zn—Co alloy containing 13% cobalt

Zn—Ni—Co: steel sheet plated with a Zn—Ni—Co alloy containing 12% nickel and 5% cobalt Zn—Ni—Cr: steel sheet plated with a Zn—Ni—Cr alloy containing 12% nickel and 5% chromium The thus plated steel sheet was either chemical conversion coated with a chromate treating solution with a roll coater and baked to form a chromate coating, or coated with zinc phosphate solution or iron phosphate solution by spraying or dipping to form the zinc phosphate or the iron phosphate coating. The steel sheet was further overcoated with a resin film by coating the resin solution with a roll coater, drying, and baking to thereby obtain a steel sheet for fuel tank. It should be noted that the plated steel sheets coated with various resin films described in JP-B 3-25349, various zinc alloy plated steel sheets, terne plated steel sheets, hot dip aluminum plated steel were used for comparison purpose.

In these examples, amount (in mole) of the alkanolamine added is the amount in relation to 1 equivalent of the oxyrane ring in the epoxy resin. Polyethylene wax and polytetrafluoroethylene wax were used for the lubricant, and Ni metal powder in particulate form and Al metal powder in flake form were used. The constitution of the steel sheets obtained is shown in Table 1.

The highly corrosion resistant steel sheets for gasoline tank of the present invention and the steel sheets of comparative examples were evaluated for their press workability, resistance weldability, outer surface corrosion resistance, inner surface corrosion resistance, and brazing ability by the evaluation procedures as described below. The results of the evaluation are shown in Table 2.

(A) Evaluation of Press Workability (1) Evaluation of Lubricity by Cylinder Forming Test Conditions of the press formation: The evaluation was conducted by coating the test piece with 1 $g/m^2$ of rust preventive oil Z5 manufactured by Idemitsu Petroleum K.K.

Diameter and shape of the punch: diameter, 33 mm; flat bottom cylinder

Clearance: 1 mm

Blank size: various

Blank holding load: 2 t

Draw rate: 60 mm/sec

In press forming the cylinder, the steel sheet was set such that the outer surface of the steel sheet was on the side of the die and the inner surface was on the side of the punch, and critical draw ratio (maximum of diameter of the die/diameter of the punch for the sample that could be drawn) was determined. The lubricity was evaluated from the value of the critical draw ratio. The sample with a larger value has higher press workability.

(2) Evaluation of Powdering Resistance of the Film by Cylinder Forming Test

Conditions of the press formation: The evaluation was conducted by coating the test piece with 1 g/m² of rust preventive oil Z5 manufactured by Idemitsu Petroleum K.K.

Diameter and shape of the punch: diameter, 33 mm; flat bottom cylinder

Clearance: 1 mm

Blank size: 66 mm

Blank holding load: 2 t

Draw rate: 60 mm/sec

The degree of the film powdering after the cup drawing was evaluated in terms of the ratio of the Zn spots measured by EPMA (Zn count ratio) before and after the cup drawing calculated by the following equation. The powdering resistance was evaluated by the criteria as described below on the bases of the Zn count ratio.

Zn count ratio=Zn spot count after the drawing/Zn spot count before the drawing

○ 0.9 or more

Δ from 0.2 to less than 0.9

× less than 0.2

(B) Evaluation of Resistance Weldability

Conditions of the seam welding:

Electrode: Chromium-copper alloy, disk-shaped electrode wherein the central part has a cross section of 15 mmR and a width of 4.5 mm and the edge part has 4 mmR and a width of 8 mm.

Welding process: double, lap seam welding

Electrode force: 400 kg

Current passage period: ²⁄₅₀ sec., current passage, on, ¹⁄₅₀ sec., current passage, off, 2 cycles of on and 1 cycle of off Cooling: water cooling from inner and outer sides Welding speed: 2.5 m/min Welding current: not constant The sample was welded by lapping the edges with the inner side in contact with each other, and the seam weldability was evaluated by determining the adequate range of welding current (kA) from breakage of the base metal in T peel tensile test and degree of the nugget lap.

(C) Evaluation of Outer Surface Corrosion Resistance

The outer surface of the steel sheet sample was coated with Emalon (a topcoat composition manufactured by Dai Nippon Toryo K.K.) to a dry thickness of 10 μm, and baked in a furnace at 120° C. for 20 minutes. The flat region was subjected to 300 cycles of CCT (cross cut test), and other region was subjected to 100 cycles of CCT under the JASO conditions (each cycle comprising salt spraying for 2 hours→drying at 60° C. and RH of 20 to 30% for 4 hours→drying at 50° C. and RH of 98% for 2 hours). The corrosion resistance was determined by the cross cut properties of the flat region and the residual thickness (mm) of the side wall of the press formed article prepared under the conditions of (A) (2). It should be noted that the thickness of the sample steel sheet before the test was 1.0 mm.

(D) Evaluation of Inner Surface Corrosion Resistance

Corrosion resistance was evaluated for the flat region and the inner surface of the flat bottom cylindrical cup formed under the conditions of (A) (2). In the evaluation of the flat region, a test sample of 20 mm×100 mm was prepared and the test sample was subjected to a corrosion test by immersing 80 mm of the sample in a fuel of 1/1 (on weight bases) unleaded gasoline/500 ppm aqueous formic acid at normal temperature for 1 months to determine the area (%) of rust occurrence.

In the evaluation of the inner surface of the flat bottom cylindrical cup, the sample specimen was prepared by drawing the steel sheet to a diameter of 33 mm and a height of 30 mm, and the fuel as described above was filled to 80% of the inner volume of the cup. The area (%) of rust occurrence in the inner surface of the cup was evaluated after one month at normal temperature. Since the fuel separates into the lower layer of the aqueous formic acid and the upper layer of the unleaded gasoline, the area (%) of rust occurrence was evaluated separately for both regions.

(E) Evaluation of Brazing Ability

Two sample sheets of 15 mm×200 mm were prepared, and the samples were disposed one on another with the outer side facing with each other and with the lapping area of 15 mm×15mm. IS-344 (JIS name, King solder #101) manufactured by Ishifuku Kinzoku Kogyo K.K and Ishifuku flux #6 manufactured by Ishifuku Kinzoku Kogyo K.K were placed between the two sheets, and the sample sheets were heated by gas for a constant heating period of 10 sec. The thus brazed sample was subjected to shear tensile test, and the result was evaluated by the criteria: ○ when breakage of the matrix metal was observed; × when peeling between the brazing filler and the matrix metal occurred; and Δ when both occurred.

TABLE 1 (1)

| | | Plated layer | | Chromate film | | Outer film | | | | | | | |
|---|---|---|---|---|---|---|---|---|---|---|---|---|---|
| | | | | | | | Polyolefin wax | | Film composition (pbw) | | | | |
| | | | Coating weight outer/inner (g/m²) | | Coating weight outer/inner (g/m²) | Resin type | Softening point (° C.) | Average particle diam. (μm) | Resin | Polyolefin wax | Silica | Tg (° C.) | Film thickness (μm) |
| E/CE | No. | Type | | Type | | | | | | | | | |
| E | 1 | GA | 45/45 | C | 40/40 | polyvinyl butyral | 120 | 5 | 100 | 10 | 30 | 80 | 1.0 |
| E | 2 | ZnNi | 30/30 | R | 40/40 | polyvinyl butyral | 120 | 5 | 100 | 10 | 30 | 80 | 1.0 |
| E | 3 | GI | 60/60 | C | 40/40 | polyvinyl butyral | 120 | 5 | 100 | 10 | 30 | 80 | 1.0 |
| E | 4 | GF | 60/60 | C | 40/40 | polyvinyl butyral | 120 | 5 | 100 | 10 | 30 | 80 | 1.0 |

TABLE 1 (1)-continued

| | | Plated layer | | Chromate film | | | Outer film | | | | | | |
|---|---|---|---|---|---|---|---|---|---|---|---|---|---|
| | | | | | | | | | | Film composition (pbw) | | | |
| | | | Coating | | Coating | | Polyolefin wax | | | | | | Film |
| | | | weight | | weight | | Softe- | Average | | Poly- | | | thick- |
| | | | outer/inner | | outer/inner | Resin | ning point | particle diam. | | olefin | | Tg | ness |
| E/CE | No. | Type | (g/m²) | Type | (g/m²) | type | (°C.) | (μm) | Resin | wax | Silica | (°C.) | (μm) |
| E | 5 | GL | 60/60 | C | 40/40 | polyvinyl butyral | 120 | 5 | 100 | 10 | 30 | 80 | 1.0 |
| E | 6 | GI | 200/200 | C | 40/40 | polyvinyl butyral | 120 | 5 | 100 | 10 | 30 | 80 | 1.0 |
| E | 7 | EG | 10/10 | C | 40/40 | polyvinyl butyral | 120 | 5 | 100 | 10 | 30 | 80 | 1.0 |
| E | 8 | GA | 45/45 | C | 5/5 | polyvinyl butyral | 120 | 5 | 100 | 10 | 30 | 80 | 1.0 |
| E | 9 | GA | 45/45 | C | 200/200 | polyvinyl butyral | 120 | 5 | 100 | 10 | 30 | 80 | 1.0 |
| E | 10 | GA | 45/45 | C | 40/40 | epoxy | 120 | 5 | 100 | 10 | 30 | 80 | 1.0 |

E: Example of the present invention, CE: Comparative Example, C: coating type, R: reaction type

TABLE 1 (2)

| | | Inner film | | | | | | | | | | |
|---|---|---|---|---|---|---|---|---|---|---|---|---|
| | | epoxy resin | | | Film composition (pbw) | | | | | | Ni | |
| | | Weight | Type | Amt. of | Amine | | | Al | | | Parti- | Film |
| | | average molecular | of alkanol | alkanol amine | modified epoxy | | | Major diam. | Minor diam. | Thick- ness | cle diam. | film thick- ness |
| E/CE | No. | weight | amine | added, mol. | resin | Al | Ni | (μm) | (μm) | (μm) | (μm) | (μm) |
| E | 1 | 35000 | diethanol amine | 0.5 | 100 | 35 | 35 | 13 | 5 | 2 | 5 | 5 |
| E | 2 | 35000 | diethanol amine | 0.5 | 100 | 35 | 35 | 13 | 5 | 2 | 5 | 5 |
| E | 3 | 35000 | diethanol amine | 0.5 | 100 | 35 | 35 | 13 | 5 | 2 | 5 | 5 |
| E | 4 | 35000 | diethanol amine | 0.5 | 100 | 35 | 35 | 13 | 5 | 2 | 5 | 5 |
| E | 5 | 35000 | diethanol amine | 0.5 | 100 | 35 | 35 | 13 | 5 | 2 | 5 | 5 |
| E | 6 | 35000 | diethanol amine | 0.5 | 100 | 35 | 35 | 13 | 5 | 2 | 5 | 5 |
| E | 7 | 35000 | diethanol amine | 0.5 | 100 | 35 | 35 | 13 | 5 | 2 | 5 | 5 |
| E | 8 | 35000 | diethanol amine | 0.5 | 100 | 35 | 35 | 13 | 5 | 2 | 5 | 5 |
| E | 9 | 35000 | diethanol amine | 0.5 | 100 | 35 | 35 | 13 | 5 | 2 | 5 | 5 |
| E | 10 | 35000 | diethanol amine | 0.5 | 100 | 35 | 35 | 13 | 5 | 2 | 5 | 5 |

TABLE 1 (3)

| | | Plated layer | | Chromate film | | | Outer film | | | | | | |
|---|---|---|---|---|---|---|---|---|---|---|---|---|---|
| | | | | | | | Polyolefin wax | | Film composition (pbw) | | | | |
| | | | Coating | | Coating | | Softe- | Average | | Poly- | | | Film |
| | | | weight | | weight | | ning | particle | | olefin | | | thick- |
| | | | outer/inner | | outer/inner | Resin | point | diam. | | | | Tg | ness |
| E/CE | No. | Type | (g/m²) | Type | (g/m²) | type | (°C.) | (μm) | Resin | wax | Silica | (°C.) | (μm) |
| E | 11 | GA | 45/45 | C | 40/40 | Alkyd | 120 | 5 | 100 | 10 | 30 | 80 | 1.0 |
| E | 12 | GA | 45/45 | C | 40/40 | Acryl | 120 | 5 | 100 | 10 | 30 | 80 | 1.0 |
| E | 13 | GA | 45/45 | C | 40/40 | urethane | 120 | 5 | 100 | 10 | 30 | 80 | 1.0 |
| E | 14 | GA | 45/45 | C | 40/40 | acryl urethane | 120 | 5 | 100 | 10 | 30 | 80 | 1.0 |

TABLE 1 (3)-continued

| | | Plated layer | | Chromate film | | | Outer film | | | | | | |
|---|---|---|---|---|---|---|---|---|---|---|---|---|---|
| | | | | | | | | Polyolefin wax | | Film composition (pbw) | | | |
| | | | Coating weight outer/inner (g/m²) | | Coating weight outer/inner (g/m²) | Resin type | Softening point (° C.) | Average particle diam. (μm) | Resin | Polyolefin wax | Silica | Tg (° C.) | Film thickness (μm) |
| E/CE | No. | Type | | Type | | | | | | | | | |
| E | 15 | GA | 45/45 | C | 40/40 | polyvinyl butyral | 70 | 5 | 100 | 10 | 30 | 80 | 1.0 |
| E | 16 | GA | 45/45 | C | 40/40 | polyvinyl butyral | 150 | 5 | 100 | 10 | 30 | 80 | 1.0 |
| E | 17 | GA | 45/45 | C | 40/40 | polyvinyl butyral | 120 | 1 | 100 | 10 | 30 | 80 | 1.0 |
| E | 18 | GA | 45/45 | C | 40/40 | polyvinyl butyral | 120 | 7 | 100 | 10 | 30 | 80 | 1.0 |
| E | 19 | GA | 45/45 | C | 40/40 | polyvinyl butyral | 120 | 5 | 100 | 1 | 30 | 80 | 1.0 |
| E | 20 | GA | 45/45 | C | 40/40 | polyvinyl butyral | 120 | 5 | 100 | 40 | 30 | 80 | 1.0 |

TABLE 1 (4)

| | | Inner film | | | | | | | | | |
|---|---|---|---|---|---|---|---|---|---|---|---|
| | | epoxy resin | | | Film composition (pbw) | | | Al | | Ni Particle diam. (μm) | Film thickness (μm) |
| E/CE | No. | Weight average molecular weight | Type of alkanol amine | Amt. of alkanol amine added, mol. | Amine modified epoxy resin | Al | Ni | Major diam. (μm) | Minor diam. (μm) | Thickness (μm) | |
| E | 11 | 35000 | diethanol amine | 0.5 | 100 | 35 | 35 | 13 | 5 | 2 | 5 | 5 |
| E | 12 | 35000 | diethanol amine | 0.5 | 100 | 35 | 35 | 13 | 5 | 2 | 5 | 5 |
| E | 13 | 35000 | diethanol amine | 0.5 | 100 | 35 | 35 | 13 | 5 | 2 | 5 | 5 |
| E | 14 | 35000 | diethanol amine | 0.5 | 100 | 35 | 35 | 13 | 5 | 2 | 5 | 5 |
| E | 15 | 35000 | diethanol amine | 0.5 | 100 | 35 | 35 | 13 | 5 | 2 | 5 | 5 |
| E | 16 | 35000 | diethanol amine | 0.5 | 100 | 35 | 35 | 13 | 5 | 2 | 5 | 5 |
| E | 17 | 35000 | diethanol amine | 0.5 | 100 | 35 | 35 | 13 | 5 | 2 | 5 | 5 |
| E | 18 | 35000 | diethanol amine | 0.5 | 100 | 35 | 35 | 13 | 5 | 2 | 5 | 5 |
| E | 19 | 35000 | diethanol amine | 0.5 | 100 | 35 | 35 | 13 | 5 | 2 | 5 | 5 |
| E | 20 | 35000 | diethanol amine | 0.5 | 100 | 35 | 35 | 13 | 5 | 2 | 5 | 5 |

TABLE 1 (5)

| | | Plated layer | | Chromate film | | | Outer film | | | | | | |
|---|---|---|---|---|---|---|---|---|---|---|---|---|---|
| | | | | | | | | Polyolefin wax | | Film composition (pbw) | | | |
| | | | Coating weight outer/inner (g/m²) | | Coating weight outer/inner (g/m²) | Resin type | Softening point (° C.) | Average particle diam. (μm) | Resin | Polyolefin wax | Silica | Tg (° C.) | Film thickness (μm) |
| E/CE | No. | Type | | Type | | | | | | | | | |
| E | 21 | GA | 45/45 | C | 40/40 | polyvinyl butyral | 120 | 5 | 100 | 10 | 5 | 80 | 1.0 |
| E | 22 | GA | 45/45 | C | 40/40 | polyvinyl butyral | 120 | 5 | 100 | 10 | 80 | 80 | 1.0 |

TABLE 1 (5)-continued

| | | Plated layer | | Chromate film | | Outer film | | | | | | | |
|---|---|---|---|---|---|---|---|---|---|---|---|---|---|
| | | | | | | | | Polyolefin wax | | Film composition (pbw) | | | |
| | | | Coating | | Coating | | | Softe- | Average | | Poly- | | Film |
| | | | weight | | weight | | | ning | particle | | olefin | | thick- |
| | | | outer/inner | | outer/inner | Resin | | point | diam. | | wax | Tg | ness |
| E/CE | No. | Type | (g/m²) | Type | (g/m²) | type | | (° C.) | (μm) | Resin | Silica | (° C.) | (μm) |
| E | 23 | GA | 45/45 | C | 40/40 | polyvinyl butyral | | 120 | 5 | 100 | 10 | 30 | 0 | 1.0 |
| E | 24 | GA | 45/45 | C | 40/40 | polyvinyl butyral | | 120 | 5 | 100 | 10 | 30 | 90 | 1.0 |
| E | 25 | GA | 45/45 | C | 40/40 | polyvinyl butyral | | 120 | 5 | 100 | 10 | 30 | 80 | 0.2 |
| E | 26 | GA | 45/45 | C | 40/40 | polyvinyl butyral | | 120 | 5 | 100 | 10 | 30 | 80 | 0.5 |
| E | 27 | GA | 45/45 | C | 40/40 | polyvinyl butyral | | 120 | 5 | 100 | 10 | 30 | 80 | 1.9 |
| E | 28 | GA | 45/45 | C | 40/40 | polyvinyl butyral | | 120 | 5 | 100 | 10 | 30 | 80 | 1.0 |
| E | 29 | GA | 45/45 | C | 40/40 | polyvinyl butyral | | 120 | 5 | 100 | 10 | 30 | 80 | 1.0 |
| E | 30 | GA | 45/45 | C | 40/40 | polyvinyl butyral | | 120 | 5 | 100 | 10 | 30 | 80 | 1.0 |

*(Note: "Resin" and "wax" are sub-columns under Polyolefin; column order is Resin, Polyolefin wax, Silica, Tg, Film thickness)*

TABLE 1 (6)

| | | Inner film | | | | | | | | |
|---|---|---|---|---|---|---|---|---|---|---|
| | | epoxy resin | | | Film composition (pbw) | | | Al | | Ni Parti- | Film |
| | | Weight average molecular | Type of alkanol | Amt. of alkanol amine | Amine modified epoxy | | | Major diam. | Minor diam. | Thick- ness | cle diam. | thick- ness |
| E/CE | No. | weight | amine | added, mol. | resin | Al | Ni | (μm) | (μm) | (μm) | (μm) | (μm) |
| E | 21 | 35000 | diethanol amine | 0.5 | 100 | 35 | 35 | 13 | 5 | 2 | 5 | 5 |
| E | 22 | 35000 | diethanol amine | 0.5 | 100 | 35 | 35 | 13 | 5 | 2 | 5 | 5 |
| E | 23 | 35000 | diethanol amine | 0.5 | 100 | 35 | 35 | 13 | 5 | 2 | 5 | 5 |
| E | 24 | 35000 | diethanol amine | 0.5 | 100 | 35 | 35 | 13 | 5 | 2 | 5 | 5 |
| E | 25 | 35000 | diethanol amine | 0.5 | 100 | 35 | 35 | 13 | 5 | 2 | 5 | 5 |
| E | 26 | 35000 | diethanol amine | 0.5 | 100 | 35 | 35 | 13 | 5 | 2 | 5 | 5 |
| E | 27 | 35000 | diethanol amine | 0.5 | 100 | 35 | 35 | 13 | 5 | 2 | 5 | 5 |
| E | 28 | 5000 | diethanol amine | 0.5 | 100 | 35 | 35 | 13 | 5 | 2 | 5 | 5 |
| E | 29 | 50000 | diethanol amine | 0.5 | 100 | 35 | 35 | 13 | 5 | 2 | 5 | 5 |
| E | 30 | 35000 | ethyl- ethanol amine | 0.5 | 100 | 35 | 35 | 13 | 5 | 2 | 5 | 5 |

TABLE 1 (7)

| | | | | | | | | Outer film | | | | | | |
|---|---|---|---|---|---|---|---|---|---|---|---|---|---|---|
| | | Plated layer | | Chromate film | | | Polyolefin wax | | Film composition | | | | | |
| | | | Coating | | Coating | | Softe- | Average | | (pbw) | | | | Film |
| | | | weight | | weight | | ning | particle | | Poly- | | | | thick- |
| | | | outer/inner | | outer/inner | Resin | point | diam. | | olefin | | Tg | ness |
| E/CE | No. | Type | (g/m²) | Type | (g/m²) | type | (°C.) | (μm) | Resin | wax | Silica | (°C.) | (μm) |
| E | 31 | GA | 45/45 | C | 40/40 | polyvinyl butyral | 120 | 5 | 100 | 10 | 30 | 80 | 1.0 |
| E | 32 | GA | 45/45 | C | 40/40 | polyvinyl butyral | 120 | 5 | 100 | 10 | 30 | 80 | 1.0 |
| E | 33 | GA | 45/45 | C | 40/40 | polyvinyl butyral | 120 | 5 | 100 | 10 | 30 | 80 | 1.0 |
| E | 34 | GA | 45/45 | C | 40/40 | polyvinyl butyral | 120 | 5 | 100 | 10 | 30 | 80 | 1.0 |
| E | 35 | GA | 45/45 | C | 40/40 | polyvinyl butyral | 120 | 5 | 100 | 10 | 30 | 80 | 1.0 |
| E | 36 | GA | 45/45 | C | 40/40 | polyvinyl butyral | 120 | 5 | 100 | 10 | 30 | 80 | 1.0 |
| E | 37 | GA | 45/45 | C | 40/40 | polyvinyl butyral | 120 | 5 | 100 | 10 | 30 | 80 | 1.0 |
| E | 38 | GA | 45/45 | C | 40/40 | polyvinyl butyral | 120 | 5 | 100 | 10 | 30 | 80 | 1.0 |
| E | 39 | GA | 45/45 | C | 40/40 | polyvinyl butyral | 120 | 5 | 100 | 10 | 30 | 80 | 1.0 |
| E | 40 | GA | 45/45 | C | 40/40 | polyvinyl butyral | 120 | 5 | 100 | 10 | 30 | 80 | 1.0 |

TABLE 1 (8)

| | | Inner film | | | | | | | | | |
|---|---|---|---|---|---|---|---|---|---|---|---|
| | | epoxy resin | | | Film composition (pbw) | | | Al | | Ni Parti- | Film |
| | | Weight average molecular | Type of alkanol | Amt. of alkanol amine | Amine modified epoxy | | | Major diam. | Minor diam. | Thick- ness | cle diam. | thick- ness |
| E/CE | No. | weight | amine | added, mol. | resin | Al | Ni | (μm) | (μm) | (μm) | (μm) | (μm) |
| E | 31 | 35000 | dipropanol amine | 0.5 | 100 | 35 | 35 | 13 | 5 | 2 | 5 | 5 |
| E | 32 | 35000 | diethanol amine | 0.2 | 100 | 35 | 35 | 13 | 5 | 2 | 5 | 5 |
| E | 33 | 35000 | diethanol amine | 1.0 | 100 | 35 | 35 | 13 | 5 | 2 | 5 | 5 |
| E | 34 | 35000 | diethanol amine | 0.5 | 100 | 15 | 15 | 13 | 5 | 2 | 5 | 5 |
| E | 35 | 35000 | diethanol amine | 0.5 | 100 | 45 | 45 | 13 | 5 | 2 | 5 | 5 |
| E | 36 | 35000 | diethanol amine | 0.5 | 100 | 45 | 45 | 8 | 5 | 2 | 5 | 5 |
| E | 37 | 35000 | diethanol amine | 0.5 | 100 | 45 | 45 | 18 | 5 | 2 | 5 | 5 |
| E | 38 | 35000 | diethanol amine | 0.5 | 100 | 45 | 45 | 13 | 1 | 2 | 5 | 5 |
| E | 39 | 35000 | diethanol amine | 0.5 | 100 | 45 | 45 | 13 | 10 | 2 | 5 | 5 |
| E | 40 | 35000 | diethanol amine | 0.5 | 100 | 45 | 45 | 13 | 5 | 1 | 5 | 5 |

TABLE 1 (9)

| | | \multicolumn{10}{c}{Outer film} | | | | | | | | | | |
|---|---|---|---|---|---|---|---|---|---|---|---|---|---|
| | | Plated layer | | Chromate film | | | Polyolefin wax | | Film composition | | | | |
| | | | Coating | | Coating | | Softe- | Average | | (pbw) | | | Film |
| | | | weight outer/inner | | weight outer/inner | Resin | ning point | particle diam. | | Poly-olefin | | Tg | thick-ness |
| E/CE | No. | Type | (g/m²) | Type | (g/m²) | type | (°C.) | (µm) | Resin | wax | Silica | (°C.) | (µm) |
| E | 41 | GA | 45/45 | C | 40/40 | polyvinyl butyral | 120 | 5 | 100 | 10 | 30 | 80 | 1.9 |
| E | 42 | GA | 45/45 | C | 40/40 | polyvinyl butyral | 120 | 5 | 100 | 10 | 30 | 80 | 1.0 |
| E | 43 | GA | 45/45 | C | 40/40 | polyvinyl butyral | 120 | 5 | 100 | 10 | 30 | 80 | 1.0 |
| E | 44 | GA | 45/45 | C | 40/40 | polyvinyl butyral | 120 | 5 | 100 | 10 | 30 | 80 | 1.0 |
| E | 45 | GA | 45/45 | C | 3/3 | polyvinyl butyral | 120 | 5 | 100 | 10 | 30 | 80 | 1.0 |
| E | 46 | GA | 45/45 | C | 230/230 | polyvinyl butyral | 120 | 5 | 100 | 10 | 30 | 80 | 1.0 |
| E | 47 | GA | 45/45 | C | 40/40 | polyvinyl butyral | 60 | 5 | 100 | 10 | 30 | 80 | 1.0 |
| E | 48 | GA | 45/45 | C | 40/40 | polyvinyl butyral | 160 | 5 | 100 | 10 | 30 | 80 | 1.0 |
| E | 49 | GA | 45/45 | C | 40/40 | polyvinyl butyral | 120 | 0.5 | 100 | 10 | 30 | 80 | 1.0 |
| E | 50 | GA | 45/45 | C | 40/40 | polyvinyl butyral | 120 | 8.0 | 100 | 10 | 30 | 80 | 1.0 |

TABLE 1 (10)

| | | \multicolumn{11}{c}{Inner film} | | | | | | | | | | |
|---|---|---|---|---|---|---|---|---|---|---|---|---|
| | | epoxy resin | | | Film composition (pbw) | | | | | | Ni | |
| | | Weight | Type | Amt. of | Amine | | | Al | | | Parti- | Film |
| | | average molecular | of alkanol | alkanol amine | modified epoxy | | | Major diam. | Minor diam. | Thick-ness | cle diam. | thick-ness |
| E/CE | No. | weight | amine | added, mol. | resin | Al | Ni | (µm) | (µm) | (µm) | (µm) | (µm) |
| E | 41 | 35000 | diethanol amine | 0.5 | 100 | 45 | 45 | 13 | 5 | 3 | 5 | 5 |
| E | 42 | 35000 | diethanol amine | 0.5 | 100 | 45 | 45 | 13 | 5 | 2 | 1 | 5 |
| E | 43 | 35000 | diethanol amine | 0.5 | 100 | 35 | 35 | 13 | 5 | 2 | 9 | 5 |
| E | 44 | 35000 | diethanol amine | 0.5 | 100 | 35 | 35 | 13 | 5 | 2 | 9 | 2 |
| E | 45 | 35000 | diethanol amine | 0.5 | 100 | 35 | 35 | 13 | 5 | 2 | 9 | 5 |
| E | 46 | 35000 | diethanol amine | 0.5 | 100 | 35 | 35 | 13 | 5 | 2 | 9 | 5 |
| E | 47 | 35000 | diethanol amine | 0.5 | 100 | 35 | 35 | 13 | 5 | 2 | 9 | 5 |
| E | 48 | 35000 | diethanol amine | 0.5 | 100 | 35 | 35 | 13 | 5 | 2 | 9 | 5 |
| E | 49 | 35000 | diethanol amine | 0.5 | 100 | 35 | 35 | 13 | 5 | 2 | 9 | 5 |
| E | 50 | 35000 | diethanol amine | 0.5 | 100 | 35 | 35 | 13 | 5 | 2 | 9 | 5 |

TABLE 1 (11)

| | | Plated layer | | Chromate film | | Outer film | | | | | | |
|---|---|---|---|---|---|---|---|---|---|---|---|---|
| | | | | | | | Polyolefin wax | | Film composition | | | |
| | | | Coating weight outer/inner (g/m²) | | Coating weight outer/inner (g/m²) | | Softening point (°C.) | Average particle diam. (μm) | (pbw) | | | Film thickness (μm) |
| E/CE | No. | Type | | Type | | Resin type | | | Resin | Polyolefin wax | Silica | Tg (°C.) | |
| E | 51 | GA | 45/45 | C | 40/40 | polyvinyl butyral | 120 | 5 | 100 | 0.5 | 30 | 80 | 1.0 |
| E | 52 | GA | 45/45 | C | 40/40 | polyvinyl butyral | 120 | 5 | 100 | 45 | 30 | 80 | 1.0 |
| E | 53 | GA | 45/45 | C | 40/40 | polyvinyl butyral | 120 | 5 | 100 | 10 | 4 | 80 | 1.0 |
| E | 54 | GA | 45/45 | C | 40/40 | polyvinyl butyral | 120 | 5 | 100 | 10 | 82 | 80 | 1.0 |
| E | 55 | GA | 45/45 | C | 40/40 | polyvinyl butyral | 120 | 5 | 100 | 10 | 30 | −10 | 1.0 |
| E | 56 | GA | 45/45 | C | 40/40 | polyvinyl butyral | 120 | 5 | 100 | 10 | 30 | 100 | 1.0 |
| E | 57 | GA | 45/45 | C | 40/40 | polyvinyl butyral | 120 | 5 | 100 | 10 | 30 | 80 | 3.5 |
| E | 58 | GA | 45/45 | C | 40/40 | polyvinyl butyral | 120 | 5 | 100 | 10 | 30 | 80 | 1.0 |
| E | 59 | GA | 45/45 | C | 40/40 | polyvinyl butyral | 120 | 5 | 100 | 10 | 30 | 80 | 1.0 |
| E | 60 | GA | 45/45 | C | 40/40 | polyvinyl butyral | 120 | 5 | 100 | 10 | 30 | 80 | 1.0 |

TABLE 1 (12)

| | | Inner film | | | | | | | | | |
|---|---|---|---|---|---|---|---|---|---|---|---|
| | | epoxy resin | | | Film composition (pbw) | | | Al | | | Ni |
| | | Weight average molecular weight | Type of alkanol amine | Amt. of alkanol amine added (mol.) | Amine modified epoxy resin | Al | Ni | Major diam. (μm) | Minor diam. (μm) | Thickness (μm) | Particle diam. (μm) | Film thickness (μm) |
| E/CE | No. | | | | | | | | | | | |
| E | 51 | 35000 | diethanol amine | 0.5 | 100 | 35 | 35 | 13 | 5 | 2 | 9 | 5 |
| E | 52 | 35000 | diethanol amine | 0.5 | 100 | 35 | 35 | 13 | 5 | 2 | 9 | 5 |
| E | 53 | 35000 | diethanol amine | 0.5 | 100 | 35 | 35 | 13 | 5 | 2 | 9 | 5 |
| E | 54 | 35000 | diethanol amine | 0.5 | 100 | 35 | 35 | 13 | 5 | 2 | 9 | 5 |
| E | 55 | 35000 | diethanol amine | 0.5 | 100 | 35 | 35 | 13 | 5 | 2 | 9 | 5 |
| E | 56 | 35000 | diethanol amine | 0.5 | 100 | 35 | 35 | 13 | 5 | 2 | 9 | 5 |
| E | 57 | 35000 | diethanol amine | 0.5 | 100 | 35 | 35 | 13 | 5 | 2 | 9 | 5 |
| E | 58 | 4300 | diethanol amine | 0.5 | 100 | 35 | 35 | 13 | 5 | 2 | 9 | 5 |
| E | 59 | 65000 | diethanol amine | 0.5 | 100 | 35 | 35 | 13 | 5 | 2 | 9 | 5 |
| E | 60 | 35000 | diethanol amine | 0.1 | 100 | 35 | 35 | 13 | 5 | 2 | 9 | 5 |

TABLE 1 (13)

| | | Plated layer | | Chromate film | | Outer film | | | | | | | |
|---|---|---|---|---|---|---|---|---|---|---|---|---|---|
| | | | | | | | | Polyolefin wax | | Film composition (pbw) | | | Film |
| | | | Coating weight outer/inner | | Coating weight outer/inner | Resin | Softening point | Average particle diam. | | Polyolefin | | Tg | thickness |
| E/CE | No. | Type | (g/m²) | Type | (g/m²) | type | (° C.) | (μm) | Resin | wax | Silica | (° C.) | (μm) |
| E | 61 | GA | 45/45 | C | 40/40 | polyvinyl butyral | 120 | 5 | 100 | 10 | 30 | 80 | 1.0 |
| E | 62 | GA | 45/45 | C | 40/40 | polyvinyl butyral | 120 | 5 | 100 | 10 | 30 | 80 | 1.0 |
| E | 63 | GA | 45/45 | C | 40/40 | polyvinyl butyral | 120 | 5 | 100 | 10 | 30 | 80 | 1.0 |
| E | 64 | GA | 45/45 | C | 40/40 | polyvinyl butyral | 120 | 5 | 100 | 10 | 30 | 80 | 1.0 |
| E | 65 | GA | 45/45 | C | 40/40 | polyvinyl butyral | 120 | 5 | 100 | 10 | 30 | 80 | 1.0 |
| E | 66 | GA | 45/45 | C | 40/40 | polyvinyl butyral | 120 | 5 | 100 | 10 | 30 | 80 | 1.0 |
| E | 67 | GA | 45/45 | C | 40/40 | polyvinyl butyral | 120 | 5 | 100 | 10 | 30 | 80 | 1.0 |
| E | 68 | GA | 45/45 | C | 40/40 | polyvinyl butyral | 120 | 5 | 100 | 10 | 30 | 80 | 1.0 |
| E | 69 | GA | 45/45 | C | 40/40 | polyvinyl butyral | 120 | 5 | 100 | 10 | 30 | 80 | 1.0 |

TABLE 1 (15)

| | | Plated layer | | Chromate film | | Outer film | | | | | | | |
|---|---|---|---|---|---|---|---|---|---|---|---|---|---|
| | | | | | | | | Polyolefin wax | | Film composition (pbw) | | | Film |
| | | | Coating weight outer/inner | | Coating weight outer/inner | Resin | Softening point | Average particle diam. | | Polyolefin | | Tg | thickness |
| E/CE | No. | Type | (g/m²) | Type | (g/m²) | type | (° C.) | (μm) | Resin | wax | Silica | (° C.) | (μm) |
| E | 70 | GA | 45/45 | C | 40/40 | polyvinyl butyral | 120 | 5 | 100 | 10 | 30 | 80 | 1.0 |
| E | 71 | GA | 45/45 | C | 40/40 | polyvinyl butyral | 120 | 5 | 100 | 10 | 30 | 80 | 1.0 |
| E | 72 | GA | 45/45 | C | 40/40 | polyvinyl butyral | 120 | 5 | 100 | 10 | 30 | 80 | 1.0 |
| E | 73 | GA | 45/45 | C | 40/40 | polyvinyl butyral | 120 | 5 | 100 | 10 | 30 | 80 | 1.0 |
| E | 74 | GA | 45/45 | C | 40/40 | polyvinyl butyral | 120 | 5 | 100 | 10 | 30 | 80 | 1.0 |
| E | 75 | GA | 45/45 | C | 40/40 | polyvinyl butyral | 120 | 5 | 100 | 10 | 30 | 80 | 1.0 |
| E | 76 | GA | 45/45 | C | 40/40 | polyvinyl butyral | 120 | 5 | 100 | 10 | 30 | 80 | 1.0 |
| E | 77 | GA | 45/45 | C | 40/40 | polyvinyl butyral | 120 | 5 | 100 | 10 | 30 | 80 | 1.0 |
| E | 78 | GA | 45/45 | C | 40/40 | polyvinyl butyral | 120 | 5 | 100 | 10 | 30 | 80 | 1.0 |

TABLE 1 (14)

| | | Inner film | | | | | | | | | |
|---|---|---|---|---|---|---|---|---|---|---|---|
| | | epoxy resin | | | Film composition (pbw) | | | | | Ni | |
| | | Weight average molecular weight | Type of alkanol amine | Amt. of alkanol amine added (mol.) | Amine modified epoxy resin | Al | Ni | Al Major diam. (μm) | Minor diam. (μm) | Thickness (μm) | Particle diam. (μm) | Film thickness (μm) |
| E/CE | No. | | | | | | | | | | | |
| E | 61 | 35000 | diethanol amine | 2.0 | 100 | 35 | 35 | 13 | 5 | 2 | 9 | 5 |
| E | 62 | 35000 | diethanol amine | 0.5 | 100 | 35 | 35 | 13 | 5 | 2 | 9 | 5 |
| E | 63 | 35000 | diethanol amine | 0.5 | 100 | 10 | 10 | 13 | 5 | 2 | 9 | 5 |
| E | 64 | 35000 | diethanol amine | 0.5 | 100 | 50 | 50 | 13 | 5 | 2 | 9 | 5 |
| E | 65 | 35000 | diethanol amine | 0.5 | 100 | 35 | 35 | 5 | 5 | 2 | 9 | 5 |
| E | 66 | 35000 | diethanol amine | 0.5 | 100 | 35 | 35 | 20 | 5 | 2 | 9 | 5 |
| E | 67 | 35000 | diethanol amine | 0.5 | 100 | 35 | 35 | 13 | 0.5 | 2 | 9 | 5 |
| E | 68 | 35000 | diethanol amine | 0.5 | 100 | 35 | 35 | 13 | 12 | 2 | 9 | 5 |
| E | 69 | 35000 | diethanol amine | 0.5 | 100 | 35 | 35 | 13 | 5 | 0.5 | 9 | 5 |

TABLE 1 (16)

| | | Inner film | | | | | | | | | |
|---|---|---|---|---|---|---|---|---|---|---|---|
| | | epoxy resin | | | Film composition (pbw) | | | | | Ni | |
| | | Weight average molecular weight | Type of alkanol amine | Amt. of alkanol amine added (mol.) | Amine modified epoxy resin | Al | Ni | Al Major diam. (μm) | Minor diam. (μm) | Thickness (μm) | Particle diam. (μm) | Film thickness (μm) |
| E/CE | No. | | | | | | | | | | | |
| E | 70 | 35000 | diethanol amine | 0.5 | 100 | 35 | 35 | 13 | 5 | 4.0 | 9 | 5 |
| E | 71 | 35000 | diethanol amine | 0.5 | 100 | 35 | 35 | 13 | 5 | 2 | 0.5 | 5 |
| E | 72 | 35000 | diethanol amine | 0.5 | 100 | 35 | 35 | 13 | 5 | 2 | 10 | 5 |
| E | 73 | 35000 | diethanol amine | 0.5 | 100 | 35 | 35 | 13 | 5 | 2 | 9 | 1 |
| E | 74 | 35000 | diethanol amine | 0.5 | 100 | 35 | 35 | 13 | 5 | 2 | 9 | 11 |
| E | 75 | 35000 | diethanol amine | 0.5 | 100 | 14 | 56 | 13 | 5 | 2 | 9 | 5 |
| E | 76 | 35000 | diethanol amine | 0.5 | 100 | 49 | 21 | 13 | 5 | 2 | 9 | 5 |
| E | 77 | 35000 | diethanol amine | 0.5 | 100 | 10 | 60 | 13 | 5 | 2 | 9 | 5 |
| E | 78 | 35000 | diethanol amine | 0.5 | 100 | 60 | 10 | 13 | 5 | 2 | 9 | 5 |

TABLE 1 (17)

| | | Plated layer | | Chromate film | | Outer film | | | | | | | |
|---|---|---|---|---|---|---|---|---|---|---|---|---|---|
| | | | | | | | | Polyolefin wax | | Film composition | | | |
| | | | Coating weight outer/inner (g/m²) | | Coating weight outer/inner (g/m²) | Resin type | Softening point (° C.) | Average particle diam. (μm) | | (pbw) | | | Film thickness (μm) |
| E/CE | No. | Type | | Type | | | | | Resin | Polyolefin wax | Silica | Tg (° C.) | |
| E | 79 | GA | 45/45 | zinc phosphate | 2 g/m² | polyvinyl butyral | 120 | 5 | 100 | 10 | 30 | 80 | 1.0 |
| E | 80 | GA | 45/45 | iron phosphate | 2 g/m² | polyvinyl butyral | 120 | 5 | 100 | 10 | 30 | 80 | 1.0 |
| E | 81 | GA | 45/45 | zinc phosphate | 1 g/m² | polyvinyl butyral | 120 | 5 | 100 | 10 | 30 | 80 | 1.0 |
| E | 82 | GA | 45/45 | zinc phosphate | 5 g/m² | polyvinyl butyral | 120 | 5 | 100 | 10 | 30 | 80 | 1.0 |
| E | 83 | GA | 45/45 | iron phosphate | 1 g/m² | polyvinyl butyral | 120 | 5 | 100 | 10 | 30 | 80 | 1.0 |
| E | 84 | GA | 45/45 | iron phosphate | 5 g/m² | polyvinyl butyral | 120 | 5 | 100 | 10 | 30 | 80 | 1.0 |
| E | 85 | GA | 45/45 | coating-type chromate | 40/40 | urethane*1 | 120 | 5 | 100 | 10 | 30 | 80 | 1.0 |
| E | 86 | GA | 45/45 | coating-type chromate | 40/40 | polyester*2 | 120 | 5 | 100 | 10 | 30 | 80 | 1.0 |
| E | 87 | GA | 45/45 | coating-type chromate | 40/40 | polyvinyl butyral | teflon wax*3 113 | 5 | 100 5 | 10 | 30 | 80 | 1.0 |

*1 manufactured by Toyobo, Bylon 200, *2 manufactured by Toyobo, UR1400 *3 manufactured by SHAMROCK, Fluoroslip 731MG

TABLE 1 (18)

| | | Inner film | | | | | | | | | |
|---|---|---|---|---|---|---|---|---|---|---|---|
| | | epoxy resin | | | Film composition (pbw) | | | | | Ni | |
| | | Weight average molecular weight | Type of alkanol amine | Amt. of alkanol amine added (mol.) | Amine modified epoxy resin | Al | Ni | Al Major diam. (μm) | Al Minor diam. (μm) | Al Thickness (μm) | Ni Particle diam. (μm) | Film thickness (μm) |
| E/CE | No. | | | | | | | | | | |
| E | 79 | 35000 | diethanol amine | 0.5 | 100 | 35 | 35 | 13 | 5 | 2 | 5 | 5 |
| E | 80 | 35000 | diethanol amine | 0.5 | 100 | 35 | 35 | 13 | 5 | 2 | 5 | 5 |
| E | 81 | 35000 | diethanol amine | 0.5 | 100 | 35 | 35 | 13 | 5 | 2 | 5 | 5 |
| E | 82 | 35000 | diethanol amine | 0.5 | 100 | 35 | 35 | 13 | 5 | 2 | 5 | 5 |
| E | 83 | 35000 | diethanol amine | 0.5 | 100 | 35 | 35 | 13 | 5 | 2 | 5 | 5 |
| E | 84 | 35000 | diethanol amine | 0.5 | 100 | 35 | 35 | 13 | 5 | 2 | 5 | 5 |
| E | 85 | 35000 | diethanol amine | 0.5 | 100 | 35 | 35 | 13 | 5 | 2 | 5 | 5 |

TABLE 1 (18)-continued

| | | Inner film | | | | | | | | | |
|---|---|---|---|---|---|---|---|---|---|---|---|
| | | epoxy resin | | | Film composition (pbw) | | | | | Ni Particle | Film |
| | | Weight average molecular | Type of alkanol | Amt. of alkanol amine | Amine modified epoxy | | | Al Major diam. | Minor diam. | Thickness | diam. | thickness |
| E/CE | No. | weight | amine | added (mol.) | resin | Al | Ni | (μm) | (μm) | (μm) | (μm) | (μm) |
| E | 86 | 35000 | diethanol amine | 0.5 | 100 | 35 | 35 | 13 | 5 | 2 | 5 | 5 |
| E | 87 | 35000 | diethanol amine | 0.5 | 100 | 35 | 35 | 13 | 5 | 2 | 5 | 5 |

TABLE 1 (19)

| | | Plated layer | | Chromate film | | Outer film | | |
|---|---|---|---|---|---|---|---|---|
| E/CE | No. | Type | Coating weight outer/inner (g/m²) | Type | Coating weight outer/inner (g/m²) | (wt %) | | Film thickness (μm) |
| CE | 1 | GA | 45/45 | Coating | 40/40 | • Al powder (flake, thickness 3 μm) 45<br>• rubber modified epoxy resin 30 ┐<br>  ┌─butadiene-acrylonitrile copolymer rubber 25 ┐<br>  └─novolak-type epoxy resin 75 ┘ ├─54<br>• phenoxy resin 70 ┘<br>• nonionic fluorosurfactant 1 | | 12 |
| CE | 2 | GA | 45/45 | Coating | 40/40 | None | | |
| CE | 3 | GA | 45/45 | Coating | 40/40 | • Al powder (flake, thickness 3 μm) 45<br>• rubber modified epoxy resin 30 ┐<br>  ┌─butadiene-acrylonitrile copolymer rubber 25 ┐<br>  └─novolak-type epoxy resin 75 ┘ ├─54<br>• phenoxy resin 70 ┘<br>• nonionic fluorosurfactant 1 | | 11 |

TABLE 1 (20)

| | | Inner film | |
|---|---|---|---|
| E/CE | No. | (wt %) | Film thickness (μm) |
| CE | 1 | • Al powder (flake, thickness 3 μm) 45<br>• rubber modified epoxy resin 30 ┐<br>  ┌─butadiene-acrylonitrile copolymer rubber 25 ┐<br>  └─novolak-type epoxy resin 75 ┘ ├─54<br>• phenoxy resin 70 ┘<br>• nonionic fluorosurfactant 1 | 12 |
| CE | 2 | • Al powder (flake, thickness 3 μm) 45<br>• rubber modified epoxy resin 30 ┐<br>  ┌─butadiene-acrylonitrile copolymer rubber 25 ┐<br>  └─novolak-type epoxy resin 75 ┘ ├─54<br>• phenoxy resin 70 ┘<br>• nonionic fluorosurfactant 1 | 11 |
| CE | 3 | None | |

TABLE 1 (21)

| E/CE | No. | Plated layer Type | Coating weight outer/inner (g/m²) | Chromate film Type | Coating weight outer/inner (g/m²) | Outer film (wt %) | | Film thickness (μm) |
|---|---|---|---|---|---|---|---|---|
| CE | 4 | ZnNi | 30/30 | coating | 40/40 | • Al powder (flake, thickness 3 μm)<br>• 13% Cr stainless steel powder (15 μm diam.)<br>• rubber modified epoxy resin<br>    butadiene-acrylonitrile copolymer rubber 25<br>    novolak-type epoxy resin 75<br>• phenoxy resin<br>• nonionic fluorosurfactant | 10<br>30<br>40<br><br><br>60<br>2 — 58 | 14 |
| CE | 5 | Zn—3%Ni—5%Co | 20/20 | coating | 40/40 | • Al powder (flake, thickness 3 μm)<br>• rubber modified epoxy resin<br>    butadiene-acrylonitrile copolymer rubber 25<br>    novolak-type epoxy resin 75<br>• phenoxy resin<br>• nonionic fluorosurfactant | 50<br>30<br><br>70<br>1 — 49 | 8 |
| CE | 6 | Zn—10%Ni—0.3%Cr | 20/20 | coating | 40/40 | • Ni powder (10 μm diam.)<br>• rubber modified epoxy resin<br>    butadiene-acrylonitrile copolymer rubber 15<br>    novolak-type epoxy resin 85<br>• phenoxy resin<br>• nonionic fluorosurfactant | 45<br>13<br><br>87<br>1 — 54 | 11 |

TABLE 1 (22)

| E/CE | No. | Inner film (wt %) | | Film thickness (μm) |
|---|---|---|---|---|
| CE | 4 | • Al powder (flake, thickness 3 μm)<br>• 13% Cr stainless steel powder (15 μm diam.)<br>• rubber modified epoxy resin<br>    butadiene-acrylonitrile copolymer rubber 25<br>    novolak-type epoxy resin 75<br>• phenoxy resin<br>• nonionic fluorosurfactant | 10<br>30<br>40<br><br><br>60<br>2 — 58 | 14 |
| CE | 5 | • Al powder (flake, thickness 3 μm)<br>• rubber modified epoxy resin<br>    butadiene-acrylonitrile copolymer rubber 25<br>    novolak-type epoxy resin 75<br>• phenoxy resin<br>• nonionic fluorosurfactant | 50<br>30<br><br>70<br>1 — 49 | 8 |
| CE | 6 | • Ni powder (10 μm diam.)<br>• rubber modified epoxy resin<br>    butadiene-acrylonitrile copolymer rubber 15<br>    novolak-type epoxy resin 85<br>• phenoxy resin<br>• nonionic fluorosurfactant | 45<br>30<br><br>70<br>1 — 54 | 11 |

TABLE 1 (23)

| E/CE | No. | Plated layer Type | Coating weight outer/inner (g/m²) | Chromate film Type | Coating weight outer/inner (g/m²) | Outer Film (wt %) | | Film thickness (μm) |
|---|---|---|---|---|---|---|---|---|
| CE | 7 | Zn—13%Co | 20/20 | Coating | 40/40 | • 13% Cr stainless steel powder (15 μm diam.)<br>• rubber modified epoxy resin<br>    butadiene-acrylonitrile copolymer rubber — 25<br>    novolak-type epoxy resin — 75<br>• phenoxy resin<br>• nonionic fluorosurfactant | 30<br>30 ⎤<br>⎥ 67<br>70 ⎦<br>3 | 13 |
| CE | 8 | Zn—20%Fe | 20/20 | Coating | 40/40 | • Al powder (flake, thickness 3 μm)<br>• rubber modified epoxy resin<br>    butadiene-acrylonitrile copolymer rubber — 25<br>    novolak-type epoxy resin — 75<br>• phenoxy resin<br>• nonionic fluorosurfactant | 50<br>30 ⎤<br>⎥ 49<br>70 ⎦<br>1 | 9 |
| CE | 9 | Zn—3%Al | 20/20 | Coating | 40/40 | • 13% Cr stainless steel powder (15 μm diam.)<br>• rubber modified epoxy resin<br>    butadiene-acrylonitrile copolymer rubber — 25<br>    novolak-type epoxy resin — 75<br>• phenoxy resin<br>• nonionic fluorosurfactant | 30<br>30 ⎤<br>⎥ 68<br>70 ⎦<br>2 | 13 |

TABLE 1 (24)

| E/CE | No. | Inner film (wt %) | | Film thickness (μm) |
|---|---|---|---|---|
| CE | 7 | • 13% Cr stainless steel powder (15 μm diam.)<br>• rubber modified epoxy resin<br>    butadiene-acrylonitrile copolymer rubber — 25<br>    novolak-type epoxy resin — 75<br>• phenoxy resin<br>• nonionic fluorosurfactant | 30<br>30 ⎤<br>⎥ 67<br>70 ⎦<br>3 | 13 |
| CE | 8 | • Al powder (flake, thickness 3 μm)<br>• rubber modified epoxy resin<br>    butadiene-acrylonitrile copolymer rubber — 25<br>    novolak-type epoxy resin — 75<br>• phenoxy resin<br>• nonionic fluorosurfactant | 45<br>30 ⎤<br>⎥ 54<br>70 ⎦<br>1 | 9 |
| CE | 9 | • 13% Cr stainless steel powder (15 μm diam.)<br>• rubber modified epoxy resin<br>    butadiene-acrylonitrile copolymer rubber — 25<br>    novolak-type epoxy resin — 75<br>• phenoxy resin<br>• nonionic fluorosurfactant | 30<br>30 ⎤<br>⎥ 68<br>70 ⎦<br>2 | 13 |

TABLE 1 (25)

| E/CE | No. | Plated layer Type | Plated layer Coating weight outer/inner (g/m²) | Chromate film Type | Chromate film Coating weight outer/inner (g/m²) | Outer film (wt %) | Outer film Film thickness (μm) | Inner film (wt %) | Inner film Film thickness (μm) |
|---|---|---|---|---|---|---|---|---|---|
| CE | 10 | GA | 45/45 | — | —/— | — | — | — | — |
| CE | 11 | ZnNi | 30/30 | — | —/— | — | — | — | — |
| CE | 12 | terne plated steel sheet | 45/45 | — | —/— | — | — | — | — |
| CE | 13 | Al plated steel sheet | 40/40 | — | —/— | — | — | — | — |

TABLE 1 (26)

| E/CE | No. | Plated layer Type | Plated layer Coating weight outer/inner (g/m²) | Chromate film Type | Chromate film Coating weight outer/inner (g/m²) | Outer film pbw | Outer film Film thickness (μm) | Inner film pbw | Inner film Film thickness (μm) |
|---|---|---|---|---|---|---|---|---|---|
| CE | 14 | GA | 45/45 | coating | 40/40 | ①※ | 1 | ①※ | 5 |
|  | 15 | GA | 45/45 | coating | 40/40 | ①※ | 1 | ①※ | 2 |
|  | 16 | GA | 45/45 | coating | 40/40 | ①※ | 1 | ①※ | 10 |
|  | 17 | GA | 45/45 | coating | 40/40 | ②※ | 1 | ②※ | 5 |
|  | 18 | GA | 45/45 | coating | 40/40 | ②※ | 1 | ②※ | 2 |
|  | 19 | GA | 45/45 | coating | 40/40 | ②※ | 1 | ②※ | 10 |
|  | 20 | GA | 45/45 | coating | 40/40 | ③※ | 1 | ③※ | 5 |
|  | 21 | GA | 45/45 | coating | 40/40 | ③※ | 1 | ③※ | 2 |
|  | 22 | GA | 45/45 | coating | 40/40 | ③※ | 1 | ③※ | 10 |
|  | 23 | GA | 45/45 | coating | 40/40 | ④※ | 1 | ④※ | 5 |
|  | 24 | GA | 45/45 | coating | 40/40 | ④※ | 1 | ④※ | 2 |
|  | 25 | GA | 45/45 | coating | 40/40 | ④※ | 1 | ④※ | 10 |

※Described in Table 1 (27)

TABLE 1 (27)

| Notes of Table 1 (26) | ① | ② | ③ | ④ |
|---|---|---|---|---|
| Phenoxy resin (GZ 9713 manufactured by Ciba-Geigy) | 112.00 | 112.00 | 112.00 | 112.00 |
| Calcium oxide (manufactured by Baker Products) | 1.09 | 1.09 | 1.09 | 1.09 |
| Hygroscopic agent (Suspensol 220 manufactured by Polyresin) | 1.09 | 1.09 | 1.09 | 1.09 |
| Phenol resin (Z 949U manufactured by Ciba-Geigy) | 4.04 | 4.04 | 4.04 | 4.04 |
| Curing agent (MX-61 manufactured by Reichhold) | 5.67 | 5.67 | 5.67 | 5.67 |
| Al powder (5250 manufactured by Alcoa) | 13.61 | 11.6 | 20.4 | 27.2 |
| Polytetrafluoroethylene (HT-1 manufactured by Micropowder) | 1.41 | 1.41 | 1.41 | 1.41 |
| Ni powder (525 manufactured by Inco) | 22.68 | 22.7 | 22.7 | 22.7 |
| Suspending agent (Suspensol 220 manufactured by Polyresin) | 5.99 | 5.99 | 5.99 | 5.99 |

TABLE 2 (1)

| E/CE | No. | Press workability Critical draw ratio | Press workability Powdering resistance | Seam weldability Range of appropriate welding current (kA) | Thickness after testing the outer surface corrosion resistance (mm) Flat region | Thickness after testing the outer surface corrosion resistance (mm) Cross cut of the flat region | Thickness after testing the outer surface corrosion resistance (mm) Press worked region |
|---|---|---|---|---|---|---|---|
| E | 1 | 2.20 | ○ | 8.5–19.8 | 0.8 | 0.6 | 0.4 |
| E | 2 | 2.20 | ○ | 8.0–19.8 | 0.7 | 0.5 | 0.3 |
| E | 3 | 2.20 | ○ | 12.0–19.8 | 0.7 | 0.5 | 0.7 |
| E | 4 | 2.20 | ○ | 11.0–19.8 | 0.9 | 0.7 | 0.8 |
| E | 5 | 2.20 | ○ | 8.5–19.8 | 1.0 | 0.8 | 0.5 |
| E | 6 | 2.20 | ○ | 14.0–19.8 | 1.0 | 0.9 | 0.6 |
| E | 7 | 2.20 | ○ | 8.5–19.8 | 0.5 | 0.2 | pinhole |

TABLE 2 (1)-continued

| | | Press workability | | Seam weldability | Thickness after testing the outer surface corrosion resistance (mm) | | |
|---|---|---|---|---|---|---|---|
| | | | | Range of | | Cross cut | |
| E/CE | No. | Critical draw ratio | Powdering resis- tance | appropriate welding current (kA) | Flat region | of the flat region | Press worked region |
| E | 8 | 2.19 | ○ | 8.5–19.8 | 0.8 | 0.6 | 0.4 |
| E | 9 | 2.19 | ○ | 8.5–19.8 | 0.8 | 0.6 | 0.4 |
| E | 10 | 2.20 | ○ | 8.5–19.8 | 0.8 | 0.6 | 0.4 |
| E | 11 | 2.20 | ○ | 8.5–19.8 | 0.8 | 0.6 | 0.4 |
| E | 12 | 2.20 | ○ | 8.5–19.8 | 0.8 | 0.6 | 0.4 |
| E | 13 | 2.20 | ○ | 8.5–19.8 | 0.8 | 0.6 | 0.4 |
| E | 14 | 2.20 | ○ | 8.5–19.8 | 0.8 | 0.6 | 0.4 |
| E | 15 | 2.18 | ○ | 8.5–19.8 | 0.8 | 0.6 | 0.4 |

TABLE 2 (2)

| | | Inner surface corrosion resistance (Area of rust occurrence, %) | | | | |
|---|---|---|---|---|---|---|
| | | Flat region | | Flat bottom cylindrical cup | | |
| E/CE | No. | The region immersed in gasoline | The region immersed in formic acid | The region immersed in gasoline | The region immersed in formic acid | Brazing ability |
| E | 1 | 0 | 10 | 0 | 15 | ○ |
| E | 2 | 0 | 10 | 0 | 15 | ○ |
| E | 3 | 0 | 10 | 0 | 15 | ○ |
| E | 4 | 0 | 10 | 0 | 15 | ○ |
| E | 5 | 0 | 10 | 0 | 15 | ○ |
| E | 6 | 0 | 10 | 0 | 13 | ○ |
| E | 7 | 0 | 10 | 0 | 13 | ○ |
| E | 8 | 0 | 10 | 0 | 13 | ○ |
| E | 9 | 0 | 10 | 0 | 13 | ○ |
| E | 10 | 0 | 10 | 0 | 13 | ○ |
| E | 11 | 0 | 10 | 0 | 13 | ○ |
| E | 12 | 0 | 10 | 0 | 15 | ○ |
| E | 13 | 0 | 10 | 0 | 15 | ○ |
| E | 14 | 0 | 10 | 0 | 15 | ○ |
| E | 15 | 0 | 10 | 0 | 15 | ○ |

TABLE 2 (3)

| | | Press workability | | Seam weldability | Thickness after testing the outer surface corrosion resistance (mm) | | |
|---|---|---|---|---|---|---|---|
| | | | | Range of | | Cross cut | |
| E/CE | No. | Critical draw ratio | Powdering resis- tance | appropriate welding current (kA) | Flat region | of the flat region | Press worked region |
| E | 16 | 2.18 | ○ | 8.5–19.8 | 0.8 | 0.6 | 0.4 |
| E | 17 | 2.18 | ○ | 8.5–19.8 | 0.8 | 0.6 | 0.4 |
| E | 18 | 2.20 | ○ | 8.5–19.8 | 0.8 | 0.6 | 0.4 |
| E | 19 | 2.18 | ○ | 8.5–19.8 | 0.8 | 0.6 | 0.4 |
| E | 20 | 2.18 | ○ | 8.5–19.8 | 0.8 | 0.6 | 0.4 |
| E | 21 | 2.18 | ○ | 8.5–19.8 | 0.8 | 0.6 | 0.4 |
| E | 22 | 2.18 | ○ | 9.3–19.8 | 0.8 | 0.6 | 0.4 |
| E | 23 | 2.20 | ○ | 8.5–19.8 | 0.8 | 0.6 | 0.4 |
| E | 24 | 2.20 | ○ | 8.5–19.8 | 0.8 | 0.6 | 0.4 |

TABLE 2 (3)-continued

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 25 | 2.10 | ○ | 8.0–19.8 | 0.4 | 0.3 | pinhole |
| E | 26 | 2.10 | ○ | 6.5–19.8 | 0.7 | 0.5 | 0.3 |
| E | 27 | 2.25 | ○ | 7.0–19.8 | 0.9 | 0.7 | 0.5 |
| E | 28 | 2.20 | ○ | 8.5–19.8 | 0.8 | 0.6 | 0.4 |
| E | 29 | 2.20 | ○ | 8.5–19.8 | 0.8 | 0.6 | 0.4 |
| E | 30 | 2.20 | ○ | 8.5–19.8 | 0.8 | 0.6 | 0.4 |

TABLE 2 (4)

| E/CE | No. | Inner surface corrosion resistance (Area of rust occurrence, %) | | | | Brazing ability |
|---|---|---|---|---|---|---|
| | | Flat region | | Flat bottom cylindrical cup | | |
| | | The region immersed in gasoline | The region immersed in formic acid | The region immersed in gasoline | The region immersed in formic acid | |
| E | 16 | 0 | 10 | 0 | 15 | ○ |
| E | 17 | 0 | 10 | 0 | 15 | ○ |
| E | 18 | 0 | 10 | 0 | 15 | ○ |
| E | 19 | 0 | 10 | 0 | 15 | ○ |
| E | 20 | 0 | 10 | 0 | 13 | ○ |
| E | 21 | 0 | 10 | 0 | 13 | ○ |
| E | 22 | 0 | 10 | 0 | 13 | ○ |
| E | 23 | 0 | 10 | 0 | 13 | ○ |
| E | 24 | 0 | 10 | 0 | 13 | ○ |
| E | 25 | 0 | 10 | 0 | 15 | ○ |
| E | 26 | 0 | 10 | 0 | 15 | ○ |
| E | 27 | 5 | 10 | 0 | 15 | ○ |
| E | 28 | 0 | 16 | 5 | 18 | ○ |
| E | 29 | 0 | 6 | 0 | 15 | ○ |
| E | 30 | 0 | 8 | 0 | 13 | ○ |

TABLE 2 (5)

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 31 | 2.20 | ○ | 8.5–19.8 | 0.8 | 0.6 | 0.4 |
| E | 32 | 2.20 | ○ | 8.5–19.8 | 0.8 | 0.6 | 0.4 |
| E | 33 | 2.20 | ○ | 8.5–19.8 | 0.8 | 0.6 | 0.4 |
| E | 34 | 2.20 | ○ | 12.5–19.8 | 0.8 | 0.6 | 0.4 |
| E | 35 | 2.20 | ○ | 9.5–19.8 | 0.8 | 0.6 | 0.4 |
| E | 36 | 2.20 | ○ | 10.5–19.8 | 0.8 | 0.6 | 0.4 |
| E | 37 | 2.20 | ○ | 9.0–19.8 | 0.8 | 0.6 | 0.4 |
| E | 38 | 2.20 | ○ | 9.0–19.8 | 0.8 | 0.6 | 0.4 |
| E | 39 | 2.20 | ○ | 10.0–19.8 | 0.8 | 0.6 | 0.4 |
| E | 40 | 2.20 | ○ | 9.4–19.8 | 0.8 | 0.6 | 0.4 |
| E | 41 | 2.20 | ○ | 8.0–19.8 | 0.8 | 0.6 | 0.4 |

TABLE 2 (5)-continued

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 42 | 2.20 | ○ | 10.0–19.8 | 0.8 | 0.6 | 0.4 |
| E | 43 | 2.18 | ○ | 8.5–19.8 | 0.8 | 0.6 | 0.4 |
| E | 44 | 2.18 | ○ | 8.5–19.8 | 0.8 | 0.6 | 0.4 |
| E | 45 | 1.90 | Δ | 8.5–19.8 | 0.7 | 0.5 | pinhole |

TABLE 2 (6)

| E/CE | No. | Inner surface corrosion resistance (Area of rust occurrence, %) | | | | Brazing ability |
|---|---|---|---|---|---|---|
| | | Flat region | | Flat bottom cylindrical cup | | |
| | | The region immersed in gasoline | The region immersed in formic acid | The region immersed in gasoline | The region immersed in formic acid | |
| E | 31 | 0 | 11 | 0 | 13 | ○ |
| E | 32 | 0 | 11 | 0 | 13 | ○ |
| E | 33 | 0 | 11 | 0 | 16 | ○ |
| E | 34 | 0 | 8 | 0 | 10 | ○ |
| E | 35 | 0 | 11 | 0 | 16 | ○ |
| E | 36 | 0 | 13 | 0 | 16 | ○ |
| E | 37 | 0 | 11 | 0 | 15 | ○ |
| E | 38 | 0 | 11 | 0 | 13 | ○ |
| E | 39 | 0 | 11 | 0 | 16 | ○ |
| E | 40 | 0 | 11 | 0 | 15 | ○ |
| E | 41 | 0 | 11 | 0 | 15 | ○ |
| E | 42 | 0 | 11 | 0 | 17 | ○ |
| E | 43 | 0 | 10 | 0 | 15 | ○ |
| E | 44 | 0 | 10 | 0 | 15 | ○ |
| E | 45 | 0 | 10 | 0 | 13 | ○ |

TABLE 2 (7)

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 46 | 1.90 | Δ | 10.0–18.5 | 0.8 | 0.6 | pinhole |
| E | 47 | 1.90 | Δ | 8.5–19.8 | 0.8 | 0.6 | pinhole |
| E | 48 | 1.90 | Δ | 8.5–19.8 | 0.8 | 0.6 | pinhole |
| E | 49 | 1.90 | Δ | 8.5–19.8 | 0.8 | 0.6 | pinhole |
| E | 50 | 1.90 | Δ | 8.5–19.8 | 0.8 | 0.6 | pinhole |
| E | 51 | 1.90 | Δ | 8.5–19.8 | 0.8 | 0.6 | pinhole |
| E | 52 | 1.90 | Δ | 8.5–19.8 | 0.8 | 0.6 | pinhole |
| E | 53 | 1.90 | Δ | 8.5–19.8 | 0.8 | 0.6 | pinhole |
| E | 54 | 1.90 | Δ | 8.5–19.8 | 0.8 | 0.6 | pinhole |
| E | 55 | 1.90 | Δ | 8.5–19.8 | 0.8 | 0.6 | pinhole |
| E | 56 | 1.90 | Δ | 8.5–19.8 | 0.8 | 0.6 | pinhole |
| E | 57 | 1.90 | Δ | 8.5–19.8 | 1.0 | 0.9 | pinhole |
| E | 58 | 1.90 | ○ | 8.5–19.8 | 0.8 | 0.6 | pinhole |

TABLE 2 (7)-continued

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 59 | 1.90 | ○ | 8.5–19.8 | 0.8 | 0.6 | pinhole |
| E | 60 | 1.90 | ○ | 8.5–19.8 | 0.8 | 0.6 | pinhole |
| E | 61 | 1.90 | ○ | 8.5–19.8 | 0.8 | 0.6 | pinhole |

TABLE 2 (8)

| E/CE | No. | Inner surface corrosion resistance (Area of rust occurrence, %) | | | | Brazing ability |
|---|---|---|---|---|---|---|
| | | Flat region | | Flat bottom cylindrical cup | | |
| | | The region immersed in gasoline | The region immersed in formic acid | The region immersed in gasoline | The region immersed in formic acid | |
| E | 46 | 0 | 10 | 0 | 15 | ○ |
| E | 47 | 0 | 10 | 0 | 15 | ○ |
| E | 48 | 0 | 10 | 0 | 15 | ○ |
| E | 49 | 0 | 10 | 0 | 15 | ○ |
| E | 50 | 0 | 10 | 0 | 15 | ○ |
| E | 51 | 0 | 10 | 0 | 15 | ○ |
| E | 52 | 0 | 10 | 0 | 15 | ○ |
| E | 53 | 0 | 10 | 0 | 15 | ○ |
| E | 54 | 0 | 10 | 0 | 15 | ○ |
| E | 55 | 0 | 10 | 0 | 15 | ○ |
| E | 56 | 0 | 10 | 0 | 13 | ○ |
| E | 57 | 0 | 10 | 0 | 13 | ○ |
| E | 58 | 0 | 16 | 0 | 17 | ○ |
| E | 59 | 0 | 8 | 0 | 11 | ○ |
| E | 60 | 0 | 10 | 0 | 15 | ○ |
| E | 61 | 0 | 8 | 0 | 13 | ○ |

TABLE 2 (9)

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 62 | 2.18 | ○ | 8.5–19.8 | 0.8 | 0.6 | 0.4 |
| E | 63 | 2.18 | ○ | 8.5–19.8 | 0.8 | 0.6 | 0.4 |
| E | 64 | 2.20 | ○ | 8.5–19.8 | 0.8 | 0.6 | 0.4 |
| E | 65 | 2.20 | ○ | 8.5–19.8 | 0.8 | 0.6 | 0.4 |
| E | 66 | 2.20 | ○ | 8.5–19.8 | 0.8 | 0.6 | 0.4 |
| E | 67 | 2.20 | ○ | 10.0–19.8 | 0.8 | 0.6 | 0.4 |
| E | 68 | 2.18 | ○ | 10.0–19.8 | 0.8 | 0.6 | 0.4 |
| E | 69 | 2.20 | ○ | 10.0–19.8 | 0.8 | 0.6 | 0.4 |
| E | 70 | 2.20 | ○ | 10.0–19.8 | 0.8 | 0.6 | 0.4 |
| E | 71 | 2.18 | ○ | 10.0–19.8 | 0.8 | 0.6 | 0.4 |
| E | 72 | 2.18 | ○ | 10.0–19.8 | 0.8 | 0.6 | 0.4 |
| E | 73 | 2.18 | ○ | 7.5–19.8 | 0.8 | 0.6 | 0.4 |
| E | 74 | 2.18 | ○ | 10.0–19.8 | 0.8 | 0.6 | 0.4 |

TABLE 2 (9)-continued

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| E | 75 | 2.18 | ○ | 8.5–19.8 | 0.8 | 0.5 | 0.4 |
| E | 76 | 2.18 | ○ | 8.5–19.8 | 0.8 | 0.5 | 0.4 |
| E | 77 | 2.18 | ○ | 8.5–19.8 | 0.8 | 0.5 | 0.4 |
| E | 78 | 2.18 | ○ | 8.5–19.8 | 0.8 | 0.5 | 0.4 |
| E | 79 | 2.18 | ○ | 8.5–19.8 | 0.9 | 0.6 | 0.5 |
| E | 80 | 2.18 | ○ | 8.5–19.8 | 0.9 | 0.6 | 0.5 |
| E | 81 | 2.18 | ○ | 7.5–19.8 | 1.0 | 0.7 | 0.6 |
| E | 82 | 2.18 | ○ | 10.5–19.8 | 0.8 | 0.5 | 0.4 |
| E | 83 | 2.18 | ○ | 7.5–19.8 | 1.0 | 0.7 | 0.6 |
| E | 84 | 2.18 | ○ | 10.5–19.8 | 0.8 | 0.5 | 0.4 |
| E | 85 | 2.18 | ○ | 8.5–19.8 | 0.8 | 0.6 | 0.4 |
| E | 86 | 2.18 | ○ | 8.5–19.8 | 0.8 | 0.6 | 0.4 |
| E | 87 | 2.18 | ○ | 8.5–19.8 | 0.8 | 0.6 | 0.4 |

TABLE 2 (10)

| E/CE | No. | Inner surface corrosion resistance (Area of rust occurrence, %) | | | | Brazing ability |
|---|---|---|---|---|---|---|
| | | Flat region | | Flat bottom cylindrical cup | | |
| | | The region immersed in gasoline | The region immersed in formic acid | The region immersed in gasoline | The region immersed in formic acid | |
| E | 62 | 0 | 10 | 0 | 13 | ○ |
| E | 63 | 0 | 10 | 0 | 13 | ○ |
| E | 64 | 0 | 10 | 0 | 13 | ○ |
| E | 65 | 0 | 10 | 0 | 13 | ○ |
| E | 66 | 0 | 10 | 0 | 13 | ○ |
| E | 67 | 0 | 10 | 0 | 13 | ○ |
| E | 68 | 0 | 10 | 0 | 13 | ○ |
| E | 69 | 0 | 10 | 0 | 13 | ○ |
| E | 70 | 0 | 10 | 0 | 13 | ○ |
| E | 71 | 0 | 10 | 0 | 13 | ○ |
| E | 72 | 0 | 10 | 0 | 13 | ○ |
| E | 73 | 0 | 10 | 0 | 13 | ○ |
| E | 74 | 0 | 10 | 0 | 13 | ○ |
| E | 75 | 0 | 10 | 0 | 16 | ○ |
| E | 76 | 0 | 10 | 0 | 15 | ○ |
| E | 77 | 0 | 10 | 0 | 15 | ○ |
| E | 78 | 0 | 10 | 0 | 15 | ○ |
| E | 79 | 0 | 10 | 0 | 15 | ○ |
| E | 80 | 0 | 10 | 0 | 15 | ○ |
| E | 81 | 0 | 10 | 0 | 15 | ○ |
| E | 82 | 0 | 10 | 0 | 15 | ○ |
| E | 83 | 0 | 10 | 0 | 15 | ○ |
| E | 84 | 0 | 10 | 0 | 15 | ○ |
| E | 85 | 0 | 10 | 0 | 15 | ○ |
| E | 86 | 0 | 10 | 0 | 15 | ○ |
| E | 87 | 0 | 10 | 0 | 15 | ○ |

TABLE 2 (11)

| E/CE | No. | Press workability | | Seam weldability | Thickness after testing the outer surface corrosion resistance (mm) | | |
|---|---|---|---|---|---|---|---|
| | | Critical draw ratio | Powdering resistance | Range of appropriate welding current (kA) | Flat region | Cross cut of the flat region | Press worked region |
| CE | 1 | 2.16 | X | 16.0–19.8 | 0.7 | 0.6 | pinhole |
| CE | 2 | 2.16 | X | 15.4–18.3 | 0.6 | 0.4 | pinhole |

TABLE 2 (11)-continued

| | | Press workability | | Seam weldability | Thickness after testing the outer surface corrosion resistance (mm) | | |
|---|---|---|---|---|---|---|---|
| | | | | Range of | | Cross cut | |
| E/CE | No. | Critical draw ratio | Powdering resistance | appropriate welding current (kA) | Flat region | of the flat region | Press worked region |
| CE | 3 | 2.16 | X | 13.2–17.9 | 0.7 | 0.6 | pinhole |
| CE | 4 | 2.16 | X | 15.4–18.3 | 0.7 | 0.5 | pinhole |
| CE | 5 | 2.16 | X | 16.0–19.8 | 0.7 | 0.5 | pinhole |
| CE | 6 | 2.16 | X | 16.0–19.8 | 0.7 | 0.5 | pinhole |
| CE | 7 | 2.16 | X | 16.0–19.8 | 0.7 | 0.5 | pinhole |
| CE | 8 | 2.16 | X | 16.0–19.8 | 0.7 | 0.5 | pinhole |
| CE | 9 | 2.16 | X | 16.0–19.8 | 0.7 | 0.5 | pinhole |
| CE | 10 | 2.16 | ○ | 11.5–19.8 | pinhole | pinhole | pinhole |
| CE | 11 | 2.16 | X | 14.0–15.2 | pinhole | pinhole | pinhole |
| CE | 12 | 2.16 | ○ | 11.5–19.8 | 0.7 | 0.5 | 0.3 |
| CE | 13 | 2.06 | X | 14.0–15.2 | 0.4 | 0.3 | 0.1 |
| CE | 14 | 2.00 | X | 14.0–16.9 | 0.8 | pinhole | pinhole |
| CE | 15 | 2.00 | X | 14.9–15.9 | 0.8 | pinhole | pinhole |
| CE | 16 | 1.92 | X | 14.9–15.9 | 0.8 | pinhole | pinhole |
| CE | 17 | 2.00 | X | 14.9–15.9 | 0.8 | pinhole | pinhole |
| CE | 18 | 2.00 | X | 14.9–15.9 | 0.8 | pinhole | pinhole |
| CE | 19 | 1.92 | X | 14.9–15.9 | 0.8 | pinhole | pinhole |
| CE | 20 | 2.00 | X | 14.9–15.9 | 0.8 | pinhole | pinhole |
| CE | 21 | 1.00 | X | 14.9–15.9 | 0.8 | pinhole | pinhole |
| CE | 22 | 1.92 | X | 14.9–15.9 | 0.8 | pinhole | pinhole |
| CE | 23 | 2.00 | X | 14.9–15.9 | 0.8 | pinhole | pinhole |
| CE | 24 | 2.00 | X | 14.9–15.9 | 0.8 | pinhole | pinhole |
| CE | 25 | 1.92 | X | 14.9–15.9 | 0.8 | pinhole | pinhole |

TABLE 2 (12)

| | | Inner surface corrosion resistance (Area of rust occurrence, %) | | | | |
|---|---|---|---|---|---|---|
| | | Flat region | | Flat bottom cylindrical cup | | |
| E/CE | No. | The region immersed in gasoline | The region immersed in formic acid | The region immersed in gasoline | The region immersed in formic acid | Brazing ability |
| CE | 1 | 20 | 40 | 20 | 35 | Δ |
| CE | 2 | 20 | 40 | 20 | 35 | Δ |
| CE | 3 | 20 | 40 | 20 | 35 | Δ |
| CE | 4 | 20 | 40 | 20 | 40 | Δ |
| CE | 5 | 20 | 40 | 20 | 50 | Δ |
| CE | 6 | 20 | 50 | 20 | 50 | Δ |
| CE | 7 | 20 | 60 | 20 | 50 | Δ |
| CE | 8 | 20 | 50 | 20 | 50 | Δ |
| CE | 9 | 20 | 50 | 20 | 50 | Δ |
| CE | 10 | 40 | 80 | 40 | 90 | ○ |
| CE | 11 | 40 | 90 | 50 | 100 | ○ |
| CE | 12 | 40 | 80 | 40 | 90 | ○ |
| CE | 13 | 40 | 80 | 40 | 90 | X |
| CE | 14 | 50 | 90 | 50 | 80 | X |
| CE | 15 | 70 | 95 | 70 | 90 | X |
| CE | 16 | 50 | 90 | 50 | 80 | X |
| CE | 17 | 50 | 90 | 50 | 80 | X |
| CE | 18 | 70 | 95 | 70 | 90 | X |
| CE | 19 | 50 | 90 | 50 | 80 | X |
| CE | 20 | 50 | 90 | 50 | 80 | X |
| CE | 21 | 70 | 95 | 70 | 90 | X |
| CE | 22 | 50 | 90 | 50 | 80 | X |
| CE | 23 | 50 | 90 | 50 | 80 | X |
| CE | 24 | 70 | 95 | 70 | 90 | X |
| CE | 25 | 50 | 95 | 50 | 80 | X |

INDUSTRIAL UTILITY

The steel sheet for gasoline tank of the present invention has excellent corrosion resistance, press workability, resistance weldability and brazing ability as well as excellent inner surface corrosion resistance. The steel sheet for gasoline tank of the present invention also exhibits satisfactory press workability and seam weldability during the production of the fuel tank, and after the press working, the outer surface of the tank exhibits high corrosion resistance. Therefore, the steel sheet for gasoline tank of the present invention is particularly useful when it is used as a steel sheet for fabricating a gasoline tank wherein an alcohol or an alcohol-blended gasoline is stored.

What is claimed is:

1. A highly corrosion resistant steel sheet for fuel tank comprising a lowermost layer of a Zn plating layer or a Zn-based plating layer deposited on each side of the steel sheet; a chemical conversion film deposited on the lowermost layer; a metal powder-containing organic resin film deposited on one of the chemical conversion film, said metal powder-containing organic resin film containing Al and Ni metal powders and an amine modified epoxy resin; and a silica-containing organic resin film deposited on the other chemical conversion film, said silica-containing organic resin film containing at least one resin having at least one functional group selected from the group consisting of hydroxyl group, isocyanate group, carboxyl group, glycidyl group, and amino group; silica; and a lubricant.

2. A highly corrosion resistant steel sheet for fuel tank according to claim 1 wherein said metal powder-containing organic resin film contains 30 to 110 parts by weight of the metal powder per 100 parts by weight of the organic resin; and said metal powder has a weight composition ratio of nickel to aluminum of 80/20 to 30/70.

3. A highly corrosion resistant steel sheet for fuel tank according to claim 1 wherein said silica-containing organic resin film comprises 100 parts by total weight of one or more resins containing at least one functional group selected from the group consisting of hydroxyl group, isocyanate group, carboxyl group, glycidyl group and amino group; 5 to 80 parts by weight of silica; and 1 to 40 parts by weight of a lubricant.

4. A highly corrosion resistant steel sheet for fuel tank according to claim 1 wherein said Zn-based plating layer comprises at least one member selected from the group consisting of Zn—Ni alloy plating layer, Zn—Co alloy plating layer, Zn—Fe alloy plating layer, Zn—Ni—Cr alloy plating layer, Zn—Ni—Co alloy plating layer, and Zn—Al alloy plating layer; and said lowermost layer has been deposited to a coating weight of from 10 to 200 g/m$^2$ per side of the steel sheet.

5. A highly corrosion resistant steel sheet for fuel tank according to claim 1 wherein said metal powder-containing organic resin film has a thickness in the range of from 2 to 10 μm.

6. A highly corrosion resistant steel sheet for fuel tank according to claims 1 to 5 wherein said silica-containing organic resin film has a thickness in the range of from 0.5 to 1.5 μm.

7. A highly corrosion resistant steel sheet for fuel tank according to claim 2 wherein said silica-containing organic resin film comprises 100 parts by total weight of one or more resins containing at least one functional group selected from the group consisting of hydroxyl group, isocyanate group, carboxyl group, glycidyl group and amino group; 5 to 80 parts by weight of silica; and 1 to 40 parts by weight of a lubricant.

8. A highly corrosion resistant steel sheet for fuel tank according to claim 2, wherein said Zn-based plating layer comprises at least one member selected from the group consisting of Zn—Ni alloy plating layer, Zn—Co alloy plating layer, Zn—Fe alloy plating layer, Zn—Ni—Cr alloy plating layer, Zn—Ni—Co alloy plating layer, and Zn—Al alloy plating layer; and said lowermost layer has been deposited to a coating weight of from 10 to 200 g/m$^2$ per side of the steel sheet.

9. A highly corrosion resistant steel sheet for fuel tank according to claim 3, wherein said Zn-based plating layer comprises at least one member selected from the group consisting of Zn—Ni alloy plating layer, Zn—Co alloy plating layer, Zn—Fe alloy plating layer, Zn—Ni—Cr alloy plating layer, Zn—Ni—Co alloy plating layer, and Zn—Al alloy plating layer; and said lowermost layer has been deposited to a coating weight of from 10 to 200 g/m$^2$ per side of the steel sheet.

10. A highly corrosion resistant steel sheet for fuel tank according to claim 2, wherein said metal powder-containing organic resin film has a thickness in the range of from 2 to 10 μm.

11. A highly corrosion resistant steel sheet for fuel tank according to claim 3, wherein said metal powder-containing organic resin film has a thickness in the range of from 2 to 10 μm.

12. A highly corrosion resistant steel sheet for fuel tank according to claim 4, wherein said metal powder-containing organic resin film has a thickness in the range of from 2 to 10 μm.

13. A highly corrosion resistant steel sheet for fuel tank according to claim 2, wherein said silica-containing organic resin film has a thickness in the range of from 0.5 to 1.5 μm.

14. A highly corrosion resistant steel sheet for fuel tank according to claim 3, wherein said silica-containing organic resin film has a thickness in the range of from 0.5 to 1.5 μm.

15. A highly corrosion resistant steel sheet for fuel tank according to claim 4, wherein said silica-containing organic resin film has a thickness in the range of from 0.5 to 1.5 μm.

16. A highly corrosion resistant steel sheet for fuel tank according to claim 5, wherein said silica-containing organic resin film has a thickness in the range of from 0.5 to 1.5 μm.

* * * * *

UNITED STATES PATENT AND TRADEMARK OFFICE
CERTIFICATE OF CORRECTION

PATENT NO. : 6,235,407 B1  
DATED : May 22, 2001  
INVENTOR(S) : Ogata et al.

Page 1 of 1

It is certified that error appears in the above-identified patent and that said Letters Patent is hereby corrected as shown below:

<u>Title page,</u>
Amend item [86] to read as follows:
-- [86] PCT No.: PCT/JP98/01637
§371 Date: Nov. 23, 1998
§102 (e) Date: Nov. 23, 1998 --

Signed and Sealed this

Twenty-sixth Day of March, 2002

Attest:

JAMES E. ROGAN  
*Attesting Officer*    *Director of the United States Patent and Trademark Office*

UNITED STATES PATENT AND TRADEMARK OFFICE
CERTIFICATE OF CORRECTION

PATENT NO. : 6,235,407 B1
DATED : May 22, 2001
INVENTOR(S) : Hiroyuki Ogata et al.

It is certified that error appears in the above-identified patent and that said Letters Patent is hereby corrected as shown below:

Columns 33 and 34,
Table 1 (17), should read as shown below:

Table 1 (17)

| E/CE | No. | Plated layer | | Chromate film | | Outer film | | | | | | | |
|---|---|---|---|---|---|---|---|---|---|---|---|---|---|
| | | Type | Coating weight outer/inner (g/m²) | Type | Coating weight outer/inner (g/m²) | Resin type | Polyolefin wax | | Film composition (pbw) | | | Tg (°C) | Film thickness (μm) |
| | | | | | | | Softening point (°C) | Average particle diam. (μm) | Resin | Polyolefin wax | Silica | | |
| E | 79 | GA | 45/45 | zinc phosphate | 2g/m² | polyvinyl butyral | 120 | 5 | 100 | 10 | 30 | 80 | 1.0 |
| E | 80 | GA | 45/45 | iron phosphate | 2g/m² | polyvinyl butyral | 120 | 5 | 100 | 10 | 30 | 80 | 1.0 |
| E | 81 | GA | 45/45 | zinc phosphate | 1g/m² | polyvinyl butyral | 120 | 5 | 100 | 10 | 30 | 80 | 1.0 |
| E | 82 | GA | 45/45 | zinc phosphate | 5g/m² | polyvinyl butyral | 120 | 5 | 100 | 10 | 30 | 80 | 1.0 |
| E | 83 | GA | 45/45 | iron phosphate | 1g/m² | polyvinyl butyral | 120 | 5 | 100 | 10 | 30 | 80 | 1.0 |
| E | 84 | GA | 45/45 | iron phosphate | 5g/m² | polyvinyl butyral | 120 | 5 | 100 | 10 | 30 | 80 | 1.0 |
| E | 85 | GA | 45/45 | coating-type chromate | 40/40 | urethane*1 | 120 | 5 | 100 | 10 | 30 | 80 | 1.0 |
| E | 86 | GA | 45/45 | coating-type chromate | 40/40 | poly-ester*2 | 120 | 5 | 100 | 10 | 30 | 80 | 1.0 |
| E | 87 | GA | 45/45 | coating-type chromate | 40/40 | polyvinyl butyral | teflon 113 | wax*3 5 | 100 | 10 | 30 | 80 | 1.0 |

※1 manufactured by Toyobo, Bylon 200,  ※2 manufactured by Toyobo, UR1400
※3 manufactured by SHAMROCK, Fluoroslip 731MG

UNITED STATES PATENT AND TRADEMARK OFFICE
CERTIFICATE OF CORRECTION

PATENT NO. : 6,235,407 B1
DATED : May 22, 2001
INVENTOR(S) : Hiroyuki Ogata et al.

It is certified that error appears in the above-identified patent and that said Letters Patent is hereby corrected as shown below:

Columns 37 and 38,
Table 1 (22), should read as shown below:

Table 1 (22)

| E/CE | No. | Inner film (wt%) | Film thickness (μm) |
|---|---|---|---|
| CE | 4 | · Al powder (flake, thickness 3 μm)    10<br>· 13% Cr stainless steel powder (15 μm diam.)    30<br>· rubber modified epoxy resin    40 ⎤<br>    ⎡ butadiene-acrylonitrile    25 ⎤<br>    ⎣ copolymer rubber                  ⎦ ⎬ 58<br>    ⎣ novolak-type epoxy resin    75 ⎦<br>· phenoxy resin    60<br>· nonionic fluorosurfactant    2 | 14 |
| CE | 5 | · Al powder (flake, thickness 3 μm)    50<br>· rubber modified epoxy resin    30 ⎤<br>    ⎡ butadiene-acrylonitrile    25 ⎤<br>    ⎣ copolymer rubber                  ⎦ ⎬ 49<br>    ⎣ novolak-type epoxy resin    75 ⎦<br>· phenoxy resin    70<br>· nonionic fluorosurfactant    1 | 8 |
| CE | 6 | · Ni powder (10 μm diam.)    45<br>· rubber modified epoxy resin    13 ⎤<br>    ⎡ butadiene-acrylonitrile    15 ⎤<br>    ⎣ copolymer rubber                  ⎦ ⎬ 54<br>    ⎣ novolak-type epoxy resin    85 ⎦<br>· phenoxy resin    87<br>· nonionic fluorosurfactant    1 | 11 |

UNITED STATES PATENT AND TRADEMARK OFFICE
CERTIFICATE OF CORRECTION

PATENT NO. : 6,235,407 B1
DATED : May 22, 2001
INVENTOR(S) : Hiroyuki Ogata et al.

It is certified that error appears in the above-identified patent and that said Letters Patent is hereby corrected as shown below:

<u>Columns 39 and 40,</u>
Table 1 (24), should read as shown below:

Table 1 (24)

| E/CE | No. | Inner film | | Film thickness ($\mu$ m) |
|---|---|---|---|---|
| | | | (wt%) | |
| CE | 7 | · 13% Cr stainless steel powder (15 µm diam.)   30<br>· rubber modified epoxy resin            30<br>  ┌ butadiene-acrylonitrile         25 ┐<br>  │ copolymer rubber                      ├─ 67<br>  └ novolak-type epoxy resin       75 ┘<br>· phenoxy resin                              70<br>· nonionic fluorosurfactant | 3 | 13 |
| CE | 8 | · Al powder (flake, thickness 3 µm)        50<br>· rubber modified epoxy resin            30<br>  ┌ butadiene-acrylonitrile         25 ┐<br>  │ copolymer rubber                      ├─ 49<br>  └ novolak-type epoxy resin       75 ┘<br>· phenoxy resin                              70<br>· nonionic fluorosurfactant | 1 | 9 |
| CE | 9 | · 13% Cr stainless steel powder (15 µm diam.)   30<br>· rubber modified epoxy resin            30<br>  ┌ butadiene-acrylonitrile         25 ┐<br>  │ copolymer rubber                      ├─ 68<br>  └ novolak-type epoxy resin       75 ┘<br>· phenoxy resin                              70<br>· nonionic fluorosurfactant | 2 | 13 |

Signed and Sealed this

Ninth Day of March, 2004

JON W. DUDAS
*Acting Director of the United States Patent and Trademark Office*